US012597392B2

(12) United States Patent
Han et al.

(10) Patent No.: US 12,597,392 B2
(45) **Date of Patent: *Apr. 7, 2026**

(54) ORGANIC LIGHT EMITTING DIODE DISPLAY SYSTEM

(71) Applicant: SAMSUNG ELECTRONICS CO., LTD., Suwon-si (KR)

(72) Inventors: Byunghun Han, Hwaseong-si (KR); Insuk Kim, Suwon-si (KR); Jungmoon Kim, Namyangju-si (KR); Sungjin Park, Hwaseong-si (KR); Seunggun Ham, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

This patent is subject to a terminal disclaimer.

(21) Appl. No.: 18/382,319

(22) Filed: Oct. 20, 2023

(65) Prior Publication Data

US 2024/0046881 A1 Feb. 8, 2024

Related U.S. Application Data

(63) Continuation of application No. 17/118,728, filed on Dec. 11, 2020, now Pat. No. 11,798,480.

(30) Foreign Application Priority Data

May 27, 2020 (KR) ........................ 10-2020-0063441

(51) Int. Cl.

| | |
|---|---|
| *G09G 3/3258* | (2016.01) |
| *G09G 3/3266* | (2016.01) |
| *G09G 3/3275* | (2016.01) |

(52) U.S. Cl.
CPC ......... *G09G 3/3258* (2013.01); *G09G 3/3266* (2013.01); *G09G 3/3275* (2013.01);
(Continued)

(58) Field of Classification Search
None
See application file for complete search history.

(56) References Cited

U.S. PATENT DOCUMENTS 7,227,514 B2 * 6/2007 Lee ..................... G09G 3/2965 345/60
8,988,136 B2 3/2015 Yoon et al.
(Continued)

FOREIGN PATENT DOCUMENTS

JP 6570825 B2 9/2019
KR 10-2013-0026891 A 3/2013
(Continued)

*Primary Examiner* — Roberto W Flores
(74) *Attorney, Agent, or Firm* — Muir Patent Law, PLLC

(57) ABSTRACT

An OLED display system includes a display panel, a driving circuit, a voltage generator and a power management application circuit (PMAC). The driving circuit provides scan signals to the display panel. The voltage generator generates a negative voltage based on a first driving voltage having a positive level and a second driving voltage having a negative level and provides the negative voltage to the driving circuit. The PMAC includes a power management application circuit (PMIC) and an additional circuit distinct from the PMIC and disposed externally to the PMIC. The PMIC applies a high power supply voltage and a low power supply voltage to the display panel and generates the first driving voltage based on a battery voltage. The additional circuit generates the second driving Voltage based on the battery voltage. The driving circuit generates at least one of the scan signals based on the negative voltage.

14 Claims, 17 Drawing Sheets

(52) U.S. Cl.
CPC ............... *G09G 2300/0426* (2013.01); *G09G 2300/0819* (2013.01); *G09G 2310/0243* (2013.01); *G09G 2310/08* (2013.01); *G09G 2330/021* (2013.01); *G09G 2330/028* (2013.01)

(56) References Cited

U.S. PATENT DOCUMENTS

| | | | |
|---|---|---|---|
| 9,853,068 | B2 | 12/2017 | Miyake |
| 10,148,171 | B2 | 12/2018 | Nguyen et al. |
| 10,453,873 | B2 | 10/2019 | Miyake |
| 2012/0223926 | A1 | 9/2012 | Morii et al. |
| 2013/0057529 | A1 | 3/2013 | Lee et al. |
| 2014/0159804 | A1 | 6/2014 | Yoon et al. |
| 2017/0046004 | A1 | 2/2017 | Choi |
| 2018/0053463 | A1 | 2/2018 | Kong et al. |
| 2019/0272009 | A1 | 9/2019 | Adami et al. |

FOREIGN PATENT DOCUMENTS

| | | | |
|---|---|---|---|
| KR | 10-2017-0030133 | A | 3/2017 |
| KR | 10-2019-0030286 | A | 3/2019 |
| KR | 10-1998078 | B1 | 7/2019 |

* cited by examiner

400b

ORGANIC LIGHT EMITTING DIODE DISPLAY SYSTEM

CROSS-REFERENCE TO RELATED APPLICATIONS

This is a continuation application based on pending application Ser. No. 17/118,728, filed Dec. 11, 2020, the entire contents of which is hereby incorporated by reference.

Korean Patent Application No. 10-2020-0063441, filed May 27, 2020, in the Korean Intellectual Property Office, and entitled: "Organic Light Emitting Diode Display System," is incorporated by reference herein in its entirety.

BACKGROUND

1. Field

Embodiments relate to an organic light emitting diode (OLED) display system.

2. Description of the Related Art

Various flat panel display devices that reduce weight and volume have been developed. An OLED display device has advantages such as rapid response speed and low power consumption among the flat panel display devices because the OLED device displays an image using an organic light emitting diode that emits light based on recombination of electrons and holes.

The OLED display device may include a display panel including a plurality of pixels arranged in a matrix format and each of the pixels includes transistors and an OLED element that emits light corresponding to a voltage applied to the OLED element.

SUMMARY

Embodiments are directed to an organic light emitting diode (OLED) display system, including a display panel including a plurality of pixels; a driving circuit connected to the plurality of pixels through a plurality of scan line sets and a plurality of data lines, the driving circuit configured to provide a plurality of scan signals to the display panel and provide data voltages to the data lines; a voltage generator configured to generate a negative voltage based on a first driving voltage having a positive level and on a second driving voltage having a negative level, the voltage generator configured to provide the negative voltage to the driving circuit; and a power management application circuit including a power management integrated circuit (PMIC) and an additional circuit that is distinct from the PMIC and disposed externally to the PMIC, the PMIC configured to apply a high power supply voltage and a low power supply voltage to the display panel, and generate the first driving voltage based on a battery voltage, the additional circuit configured to generate the second driving voltage based on the battery voltage. The driving circuit may be configured to generate at least one of the plurality of scan signals based on the negative voltage.

Embodiments are also directed to an organic light emitting diode (OLED) display system, including a display panel including a plurality of pixels; a driving circuit connected to the plurality of pixels through a plurality of scan line sets and a plurality of data lines, the driving circuit configured to provide a plurality of scan signals to the display panel and configured to provide data voltages to the data lines; a voltage generator configured to generate a negative voltage based on a first driving voltage having a positive level and a second driving voltage having a negative level, and configured to provide the negative voltage to the driving circuit; and a power management application circuit including a power management application circuit (PMIC) and an additional circuit, the PMIC configured to apply a high power supply voltage and a low power supply voltage to the display panel and configured to generate the first driving voltage based on a battery voltage, the additional circuit configured to generate the second driving voltage based on the battery voltage. The additional circuit may include a first part distinct from the PMIC and disposed externally to the PMIC and a second part disposed in the PMIC. The driving circuit may be configured to generate at least one of the plurality of scan signals based on the negative voltage.

Embodiments are also directed to an organic light emitting diode (OLED) display system, including a display panel including a plurality of pixels; a driving circuit connected to the plurality of pixels through a plurality of scan line sets and a plurality of data lines, the driving circuit configured to provide a plurality of scan signals to the display panel and configured to provide data voltages to the data lines; a voltage generator configured to generate a negative voltage based on a first driving voltage having a positive level and a second driving voltage having a negative level, and configured to provide the negative voltage to the driving circuit; and a power management application circuit including power management application circuit (PMIC) and an additional circuit distinct from the PMIC and disposed externally to the PMIC, the PMIC configured to apply a high power supply voltage and a low power supply voltage to the display panel and configured to generate the first driving voltage based on a battery voltage, the additional circuit configured to generate the second driving voltage based on the battery voltage. The driving circuit may be configured to generate at least one of the plurality of scan signals based on the negative voltage. The additional circuit may include a first capacitor coupled between a first node and a second node, the first node being coupled to an inductor to store the battery voltage; a first diode coupled between the second node and a ground voltage; a second diode coupled between the second node and a third node to receive the second driving voltage; and a second capacitor coupled between the third node and a fourth node connected to the ground voltage.

BRIEF DESCRIPTION OF THE DRAWINGS

Features will become apparent to those of skill in the art by describing in detail example embodiments with reference to the attached drawings in which.

DETAILED DESCRIPTION

Figure 1:
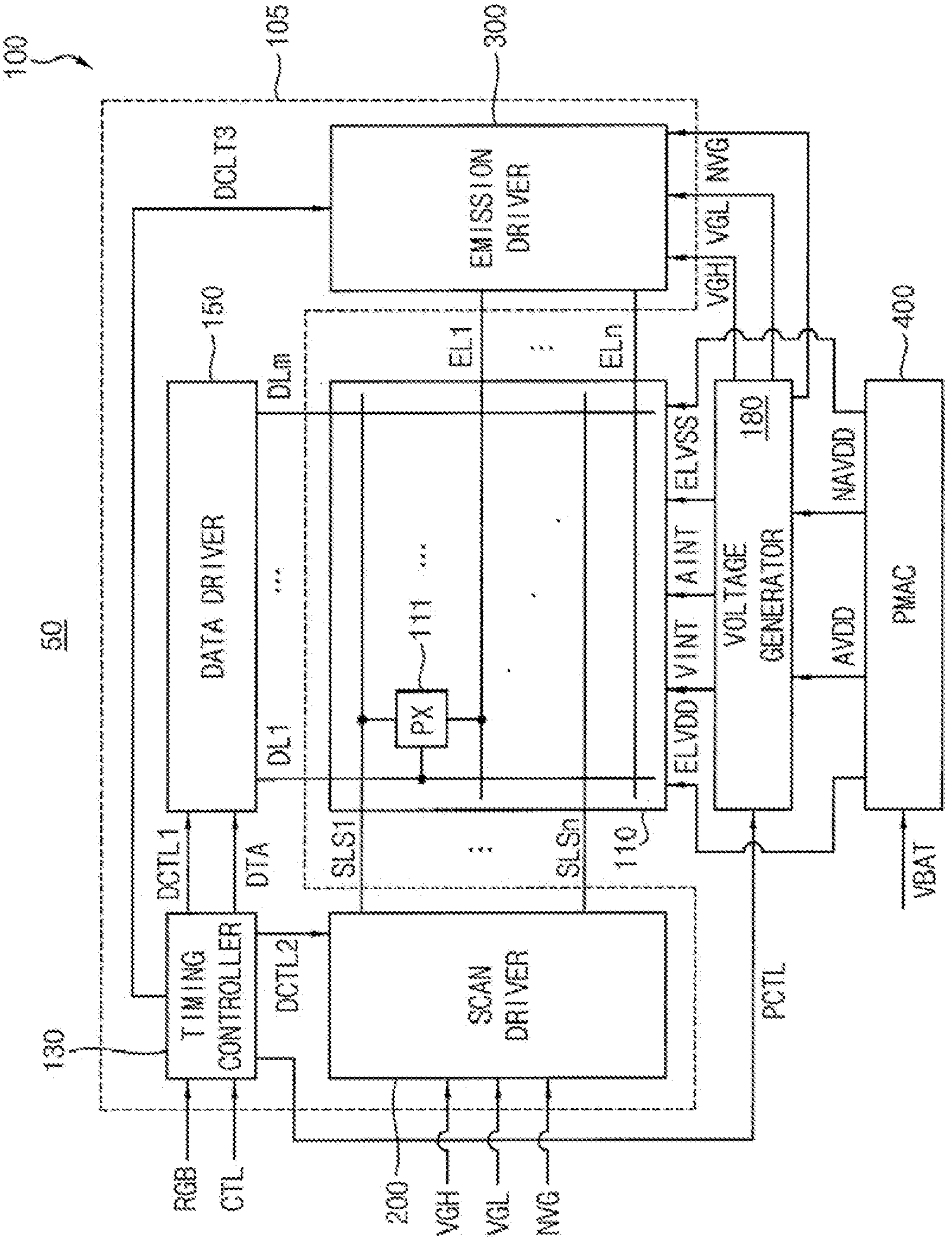
FIG. 1 is a block diagram illustrating an organic light emitting diode (OLED) display system according to an example embodiment.

FIG. 1 is a block diagram illustrating an organic light emitting diode (OLED) display system according to an example embodiment.

Referring to FIG. 1, an OLED display system 50 may include an OLED display device 100 and a power management application circuit (PMAC) 400.

The OLED display device 100 may include a driving circuit 105, a display panel 110 and a voltage generator 180. The driving circuit 105 and the voltage generator 180 may constitute a display driving integrated circuit (DDIC).

The driving circuit 105 may include a timing controller 130, a data driver 150, a scan driver 200, and an emission driver 300.

The timing controller 130, the data driver 150, the scan driver 200, and the emission driver 300 may be coupled to the display panel 110 by a chip-on flexible printed circuit (COF), a chip-on glass (COG), a flexible printed circuit (FPC), etc.

The display panel 110 may be coupled to the scan driver 200 of the driving circuit 105 through a plurality of scan line sets SLS1~SLSn (n may be, e.g., an integer greater than three). The display panel 110 may be coupled to the data driver 150 through a plurality of data lines DL1~DLm (m may be, e.g., an integer greater than three). The display panel 110 may be coupled to the emission driver 300 of the driving circuit 105 through a plurality of emission control lines EL1~ELn (n may be, e.g., an integer greater than three, and may be the same as the number of scan sets). The display panel 110 may include a plurality of pixels 111, and each pixel 111 is disposed at an intersection of each of the scan line sets SLS1~SLSn, each of the data lines DL1~DLm) and each of the emission control lines EL1~ELn.

The display panel 110 may receive a high power supply voltage ELVDD (also referred to as a first power supply voltage) and a low power supply voltage ELVSS (also referred to as a second power supply voltage) from the PMAC 400.

The display panel 110 may receive a first initialization voltage VINT and a second initialization voltage AINT. The emission driver 300 may receive a first sub driving voltage VGL, a second sub driving voltage VGH, and a negative voltage NVG from the voltage generator 180. The scan driver 200 may receive the first sub driving voltage VGL, the second sub driving voltage VGH, and the negative voltage NVG from the voltage generator 180

The scan driver 200 may apply a plurality of scan signals to each of the sub pixels 111 through a first group of scan lines SL11~SL1*n* and a second group of scan lines SL21~SL2*n* based on a second driving control signal DCTL2.

The scan driver 200 may enable at least two scan signals of the plurality of scan signals during a non-emission interval in which the pixels do not emit light such that the scan signals are partially overlapped during two consecutive horizontal periods. The horizontal period corresponds to a period of a horizontal synchronization signal that the timing controller 130 uses.

The data driver 150 may apply a data voltage to each of the pixels 111 through the plurality of data lines DL1~DLm based on a first driving control signal DCTL1.

The emission driver 300 may apply an emission control signal to each of the pixels 111 through the plurality of emission control lines EL1~ELn based on a third driving control signal DCTL3. Luminance of the display panel 110 may be adjusted based on the emission control signal.

The voltage generator 180 may provide the first initialization voltage VINT and the second initialization voltage AINT to the display panel 110, and may provide the first sub driving voltage VGL, the second sub driving voltage VGH, and the negative voltage NVG to the emission driver 300 and the scan driver 200 in response to a power control signal PCTL.

The voltage generator 180 may vary a level of the second initialization voltage AINT based on the power control signal PCTL indicating a frame rate of an image displayed in the display panel 110.

The timing controller 130 may receive input image data RGB and a control signal CTL, and may generate the first through third driving control signals DCTL1~DCTL3 and the power control signal PCTL based on the control signal CTL. The timing controller 130 may provide the first driving control signal DCTL1 to the data driver 150, the second driving control signal DCTL2 to the scan driver 200, the third driving control signal DCTL3 to the emission driver 300, and the power control signal PCTL to the voltage generator 180. The timing controller 130 may receive the input image data RGB and arrange the input image data RGB to provide a data signal DTA to the data driver 150.

The PMAC 400 may generate a first driving voltage AVDD having a positive level and a second driving voltage NAVDD having a negative level based on a battery voltage VBAT received from a battery, and may provide the first driving voltage AVDD and the second driving voltage NAVDD to the voltage generator 180. The PMAC 400 may generate the high power supply voltage ELVDD and the low power supply voltage ELVSS based on the battery voltage VBAT, and may provide the high power supply voltage ELVDD and the low power supply voltage ELVSS to the display panel 110.

The PMAC 400 may include a power management integrated circuit (PMIC) and an additional circuit that is distinct from the PMIC and is disposed externally to the PMIC. The PMIC may generate the first driving voltage AVDD, and the additional circuit may generate the second driving voltage NAVDD. The additional circuit may be referred to as an external circuit.

Figure 2:
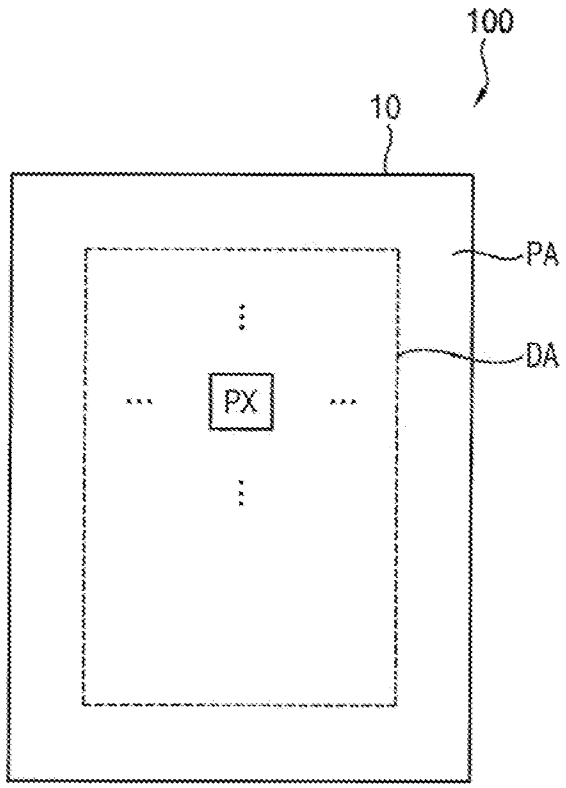
FIG. 2 is a plan view of the OLED display device of FIG. 1 according to an example embodiment.

FIG. 2 is a plan view of the OLED display device of FIG. 1 according to an example embodiment.

Referring to FIG. 2 the OLED display device 100 may include a substrate 10 that includes a display region DA and a peripheral region PA outside the display region DA.

A plurality of pixels 111 may be arranged in the display region DA of the substrate 10. Various wirings for transmitting an electrical signal to be applied to the driving circuit 105 and the display region DA may be in the peripheral region PA of the substrate 10. A dead space in the substrate 10 may be reduced according to an area occupied by the driving circuit 105 in the display region DA.

The PMAC 400 may be disposed in the peripheral region PA.

Figure 3:
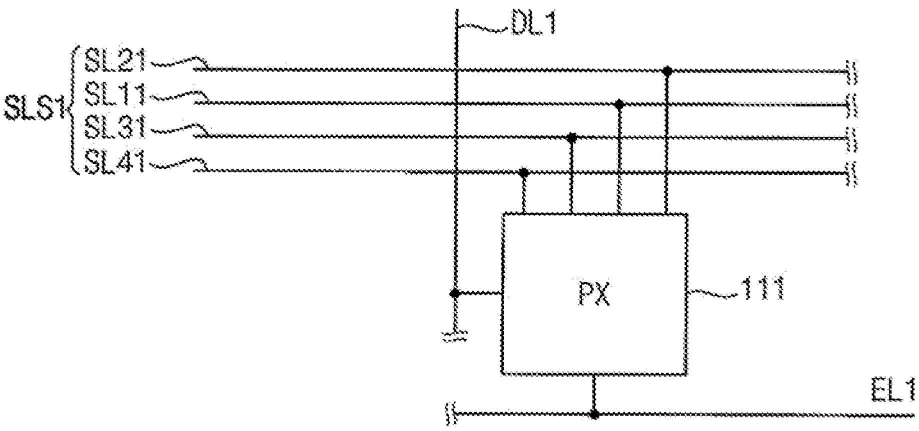
FIG. 3 illustrates connection of a pixel in the OLED display device of FIG. 1.
Figure 4:
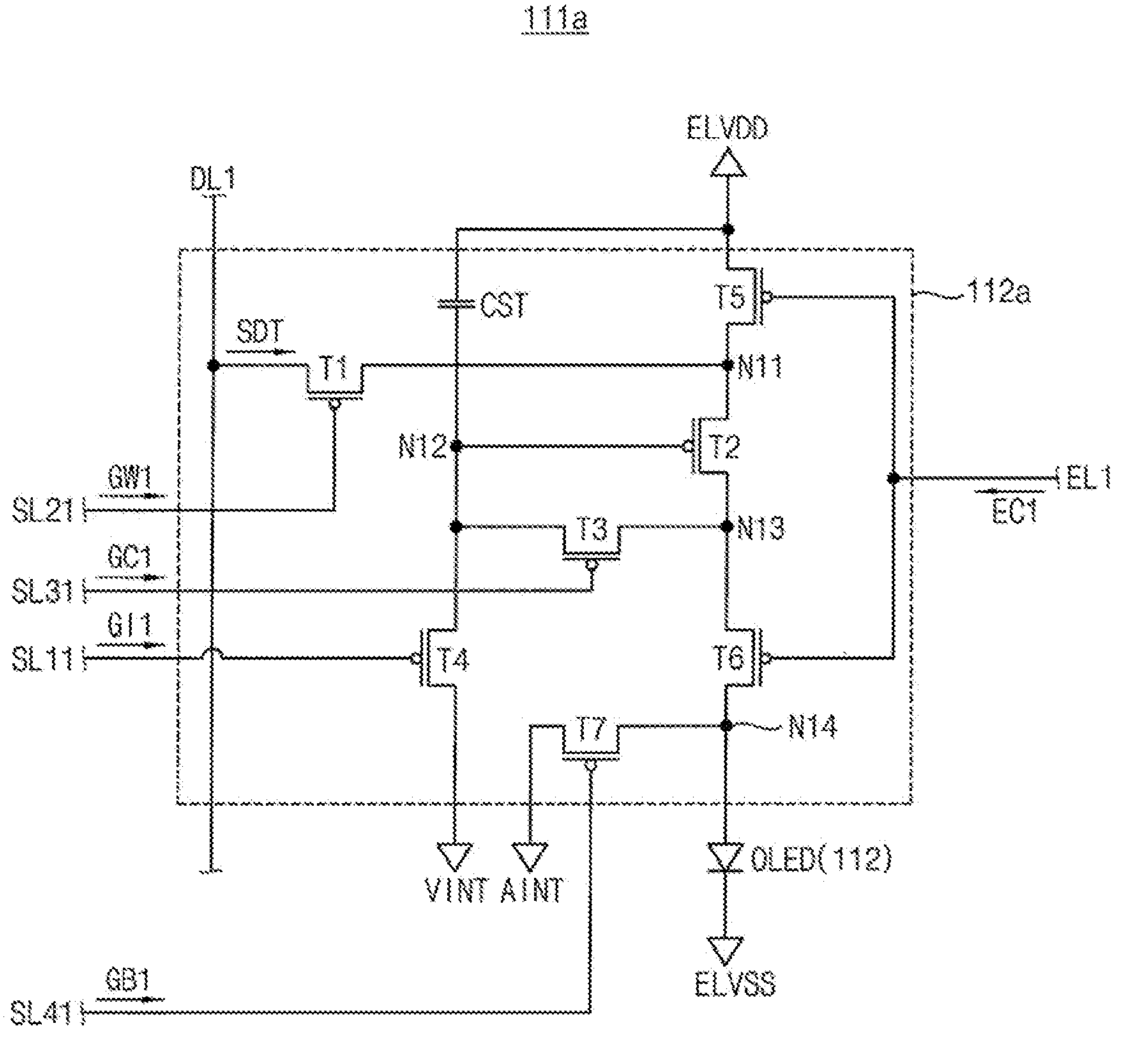
FIG. 4 is a circuit diagram illustrating an example of the pixel of FIG. 3 according to an example embodiment.

FIG. 3 illustrates connection of a pixel in the OLED display device of FIG. 1. FIG. 4 is a circuit diagram illustrating an example of a pixel of FIG. 3 according to an example embodiment.

In an example embodiment, referring to FIG. 3, the pixel 111 may be coupled to the first scan line set SLS1, a first data line DL1, and a first emission control line EL1. The first scan line set SLS1 may include a first scan line SL11, a second scan line SL21, a third scan line SL31, and a fourth scan line SL41.

Referring to FIG. 4, a pixel 111*a* may include a pixel circuit 112*a* and an OLED 112.

The pixel circuit 112*a* may include a switching transistor T1, a driving transistor T2, a compensation transistor T3, a first initialization transistor T4, first and second emission transistors T5 and T6, a second initialization transistor T7, and a storage capacitor CST.

The switching transistor T1 may be a p-channel metal-oxide semiconductor (PMOS) transistor that has a first electrode coupled to the data line DL1 to receive a data voltage SDT, a gate electrode coupled to the second scan line SL21 to receive a second scan signal GW1, and a second electrode coupled to a first node N1. The driving transistor T2 may be a PMOS transistor that has a first electrode coupled to a first node N11, a gate electrode coupled to a second node N12, and a second electrode coupled to a third node N13. The compensation transistor T3 may be a PMOS transistor that has a gate electrode coupled to the third can line SL31 to receive a third scan signal GC1, a first electrode coupled to the second node N12, and a second electrode coupled to the third node N13. The first initialization transistor T4 may be a PMOS transistor that has a gate coupled to the first scan line SL11 to receive a first scan signal GI1, a first electrode coupled to the second node N12, and a second electrode coupled to the first initialization voltage VINT. The first emission transistor T5 may be a PMOS transistor that has a first electrode coupled to the high power supply voltage ELVDD, a second electrode coupled to the first node N11, and a gate electrode coupled to the first emission control line EL1 to receive the first emission control signal EC1. The second emission transistor T6 may be a PMOS transistor that has a first electrode coupled to the third node N13, a second electrode coupled to the fourth node N14, and a gate electrode coupled to the first emission control line EL1 to receive the first emission control signal EC1. The second initialization transistor T7 may be a PMOS transistor that has a gate coupled to the fourth scan line SL41 to receive a fourth scan signal GB1, a first electrode coupled to the second initialization voltage AINT, and a second electrode coupled to the fourth node N14. The storage capacitor CST may have a first terminal coupled to the high power supply voltage ELVDD and a second terminal coupled to the second node N12. The OLED 112 may have an anode coupled to the fourth node N14 and a cathode coupled to the low power supply voltage ELVSS.

In an implementation (not shown), the pixel 111*a* may further include a bias transistor. The bias transistor may be a PMOS transistor that has a first electrode coupled to the third node N13, a second electrode coupled to a bias voltage, and a gate electrode coupled to the fourth scan line SL41 to receive the fourth scan signal GB1.

In operation of the pixel 111*a*, the switching transistor T1 transfers the data voltage SDT to the storage capacitor CST in response to the second scan signal GW1, and the OLED 112 may emit light in response to the data voltage SDT stored in the storage capacitor CST to display an image. The emission transistors T5 and T6 are turned-on or turned-off in response to the first emission control signal EC1 to provide a current to the OLED 112 or to interrupt a current provided to the OLED 112. When the current is interrupted from the OLED 112, the OLED 112 does not emit. Therefore, the emission transistors T5 and T6 may be turned on or turned off in response to the first emission control signal EC1 to adjust a luminance of the display panel 110. The compensation transistor T3 may connect the second node N12 and the third node N13 in response to the third scan signal GC1. Thus, the compensation transistor T3 may compensate for variance of threshold voltage of each driving transistor of each pixel 111 when the image is displayed by diode-connecting the gate electrode and the second electrode of the driving transistor T2. The first initialization transistor T4 may transfer the first initialization voltage VINT to the second node N12 in response to the first scan signal GI1. The first initialization transistor T4 may initialize data voltage transferred to the driving transistor T2 during a previous frame by transferring the initialization voltage VINT to the gate electrode of the driving transistor T2. The second initialization transistor T7 may transfer the second initialization voltage A1 NT to the fourth node N14 in response to the fourth scan signal GB1 to discharge parasitic capacitance between the second emission transistor T6 and the OLED 112.

Figure 5:
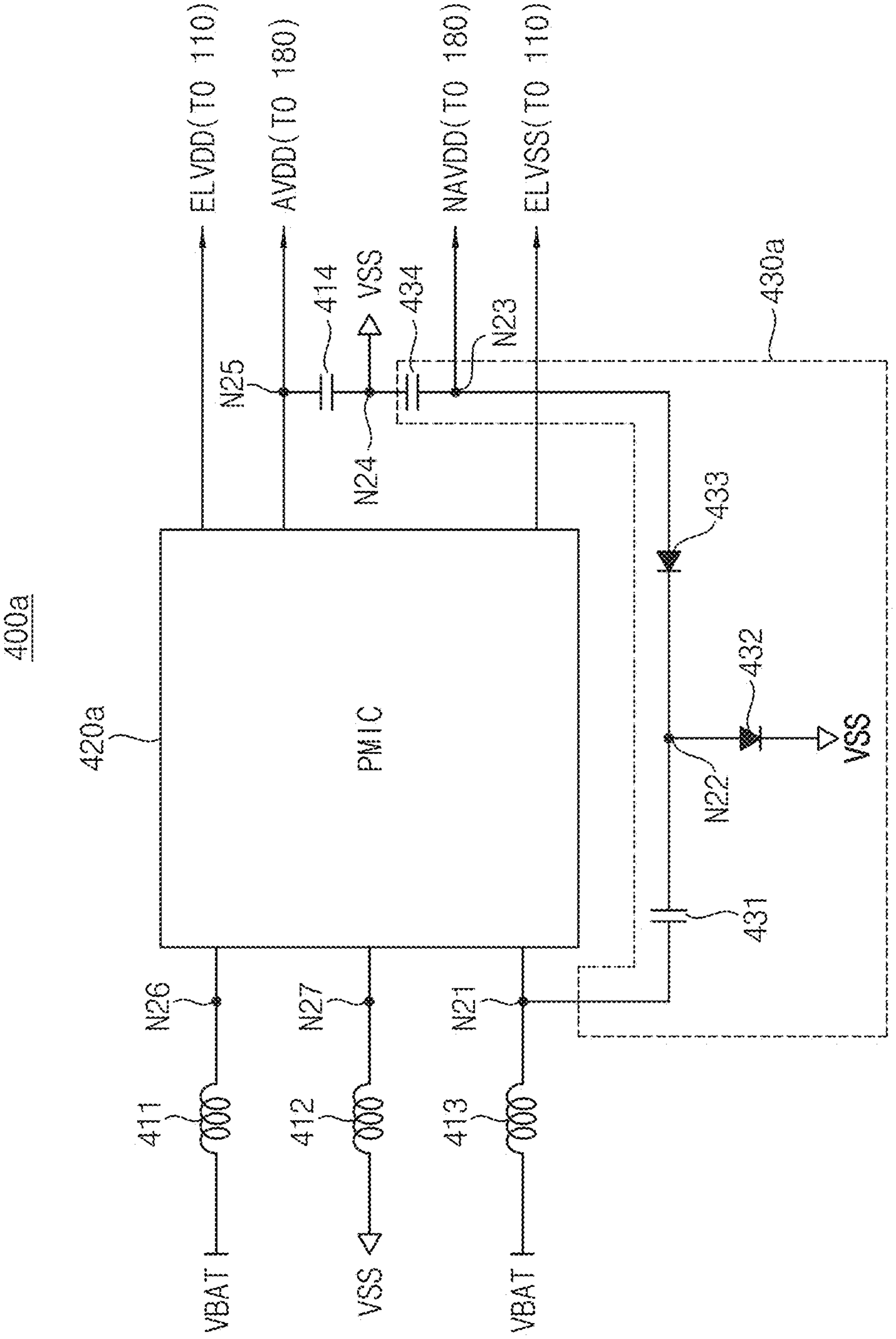
FIG. 5 is a block diagram illustrating an example of a power management application circuit (PMAC) in the OLED display system of FIG. 1 according to an example embodiment.

FIG. 5 is a block diagram illustrating an example of the PMAC in the OLED display system of FIG. 1 according to an example embodiment.

Referring to FIG. 5, a PMAC 400*a* according to an example embodiment may include a PMIC 420*a* and an additional circuit 430*a*.

The PMIC 420*a* may be coupled to an inductor 411 receiving the battery voltage VBAT at a node N26. The PMIC 420*a* may be coupled to an inductor 412 coupled to a ground voltage VSS at a node N27. The PMIC 420*a* may be coupled to an inductor 413 receiving the battery voltage VBAT at a node N21.

The PMIC 420*a* may generate the high power supply voltage ELVDD and the first driving voltage AVDD based on the battery voltage VBAT. The PMIC 420*a* may provide the high power supply voltage ELVDD to the display panel 110. The PMIC 420*a* may provide the first driving voltage AVDD to the voltage generator 180.

The PMIC 420*a* may generate the low power supply voltage ELVSS based on the ground voltage VSS. The PMIC 420*a* may provide the low power supply voltage ELVSS to the display panel 110. A capacitor 414 may be coupled between a node N25 connected to the PMIC 420*a* and a node N24 connected to the ground voltage VSS, and may store charges generated by the first driving voltage AVDD.

The additional circuit 430*a* may connected to an outside of the PMIC 420*a* between the nodes N21 and N24. The additional circuit 430*a* may generate the second driving voltage NAVDD based on the battery voltage VBAT stored in the inductor 413. The additional circuit 430*a* may provide the second driving voltage NAVDD to the voltage generator 180.

The additional circuit 430*a* may include a first capacitor 431, a first diode 432, a second diode 433, and a second capacitor 434.

The first capacitor 431 may be coupled between the node N21 and a node N22. The first diode 432 may be coupled between the node N22 and the ground voltage VSS. The second diode 433 may be coupled between the node N22 and a node N23. The second capacitor 434 may be coupled between the node N23 and the node N24. The first diode 432 may include an anode coupled to the node N22, and a cathode coupled to the ground voltage VSS. The second diode 433 may include an anode coupled to the node N23, and a cathode coupled to the node N22. The additional circuit 430*a* may output the second driving voltage NAVDD at the node N23.

Figure 6:
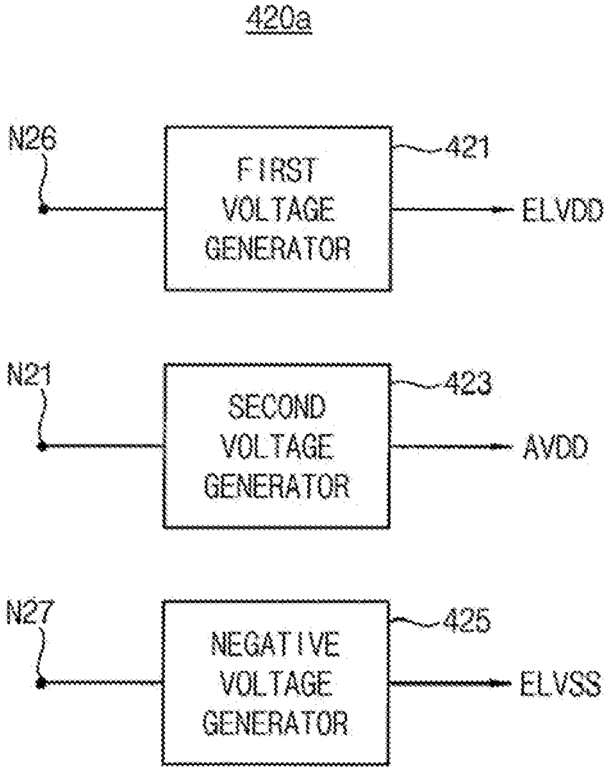
FIG. 6 is a block diagram illustrating an example of the power management integrated circuit (PMIC) in the PMAC of FIG. 5 according to an example embodiment.

FIG. 6 is a block diagram illustrating an example of the PMIC in the PMAC of FIG. 5 according to an example embodiment.

Referring to FIG. 6, the PMIC 420*a* may include a first voltage generator 421, a second voltage generator 423, and a third voltage generator 435.

The first voltage generator 421 may be connected to the node N26, and may generate the high power supply voltage ELVDD based on the battery voltage VBAT stored in the inductor 411. The second voltage generator 423 may be connected to the node N21, and may generate the first driving voltage AVDD based on the battery voltage VBAT stored in the inductor 413. The third voltage generator 435 may be connected to the node N27, and may generate the low power supply voltage ELVSS based on the battery voltage VBAT stored in the inductor 412.

Figure 7:
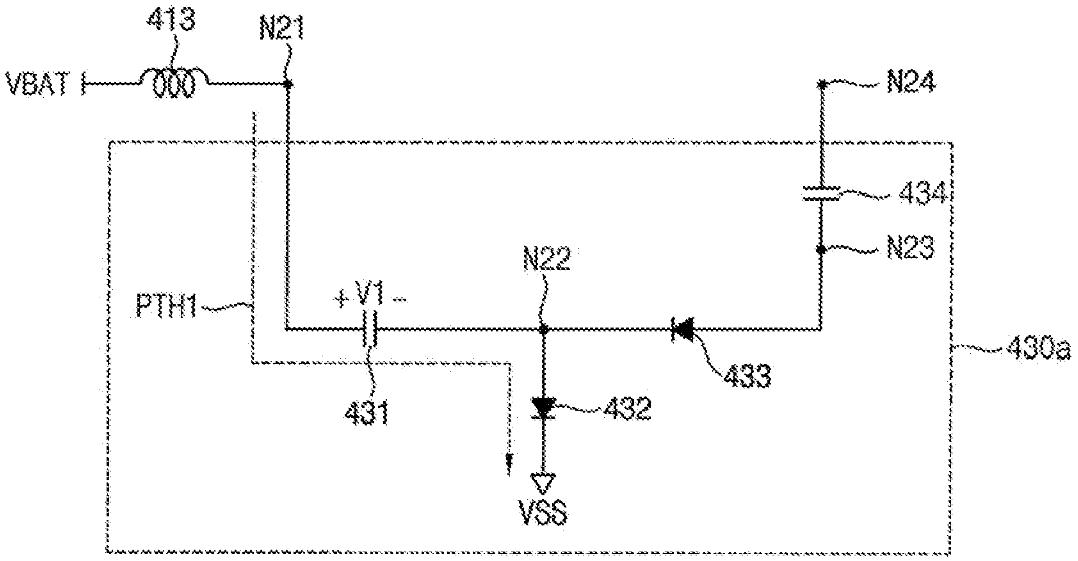
FIGS. 7 and 8 respectively illustrate current paths formed in the additional circuit in FIG. 5.
Figure 8:
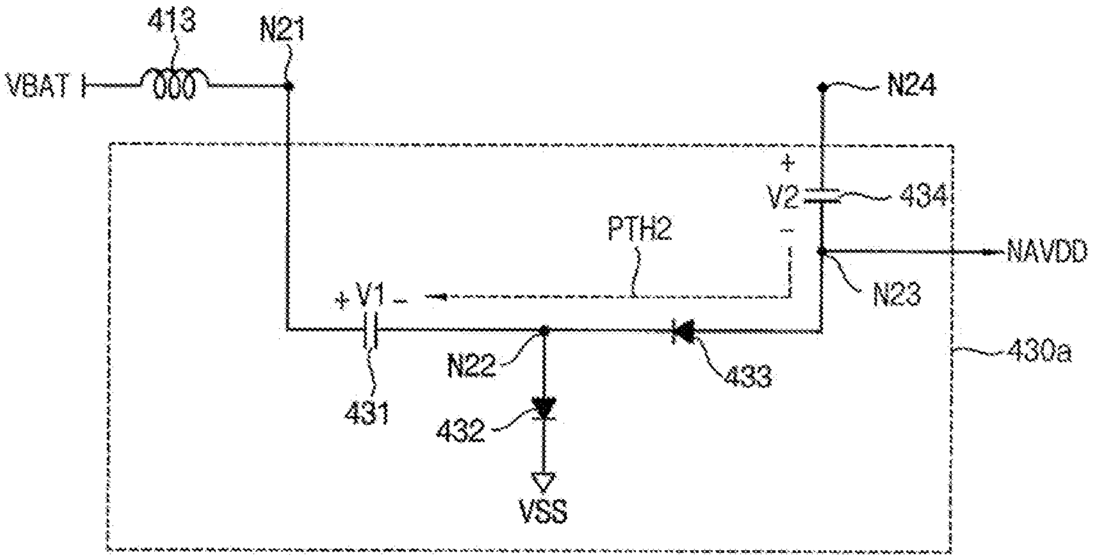

FIGS. 7 and 8 respectively illustrate current paths formed in the additional circuit in FIG. 5.

Referring to FIG. 7, when energy is stored in the inductor 413 based on the battery voltage VBAT, current flowing through the inductor 413 increases. A first current path PTH1 is formed from the node N21 to the ground voltage VSS via the first capacitor 431 and the first diode 432 due to the increased current. When the first current path PTH1 is formed, the first capacitor 431 is charged with a first voltage V1 due to charges generated by the battery voltage VBAT.

Referring to FIG. 8, after the first voltage V1 is charged in the first capacitor 431, negative charges for maintaining potential with the first voltage V1 are charged in the second capacitor 434 when a second current path PTH2 is formed from the node N23 to the first capacitor 431 via the second diode 433 and the node N22. When the negative charges are stored in the second capacitor 434, the second capacitor 434 is charged with a second voltage V2.

Therefore, the additional circuit 430*a* may provide the second driving voltage NAVDD having negative level corresponding to a level of the second voltage V2 at the node N23 when the first current path PTH1 is formed again.

Figure 9:
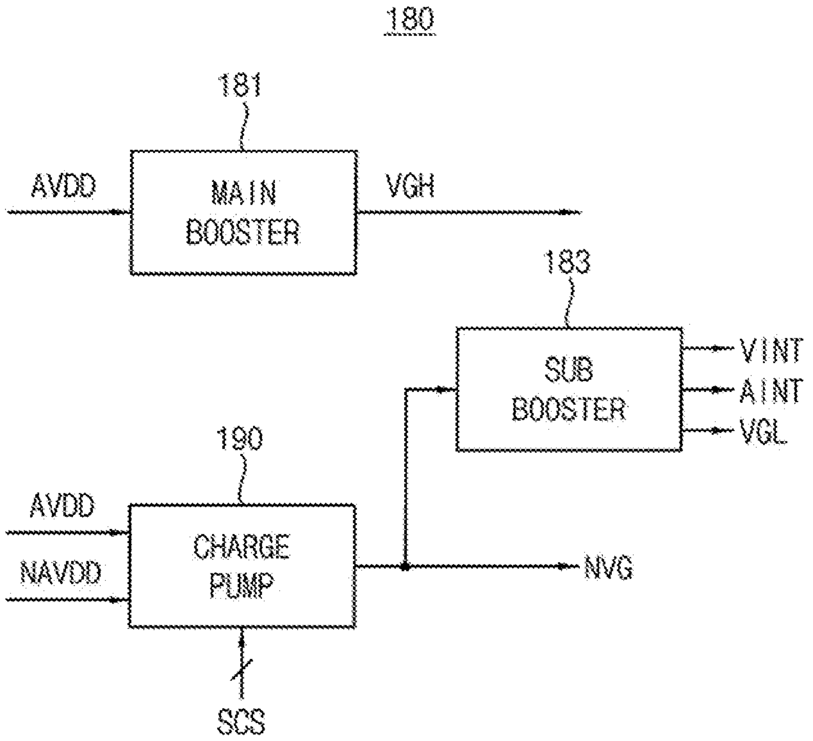
FIG. 9 is a block diagram illustrating an example of the voltage generator in the OLED display system of FIG. 1 according to an example embodiment.

FIG. 9 is a block diagram illustrating an example of the voltage generator in the OLED display system of FIG. 1 according to an example embodiment.

Referring to FIG. 9, the voltage generator 180 may include a main booster 181, a charge pump 190, and a sub booster 183.

The main booster 181 may generate the first sub driving voltage VGH based on the first driving voltage AVDD.

The charge pump 190 may generate the negative voltage NVG based on the first driving voltage AVDD, the second driving voltage NAVDD, and a plurality of switching control signals SCS.

The sub booster 183 may generate the first initialization voltage VINT, the second initialization voltage AVINT, and the second sub driving voltage VGL based on the negative voltage NVG that the charge pump 190 generates.

In example embodiments, the switching control signals SCS may be included in the power control signal PCTL in FIG. 1, or the timing controller 130 may provide the switching control signals SCS to the voltage generator 180 independently from the power control signal PCTL.

Figure 10:
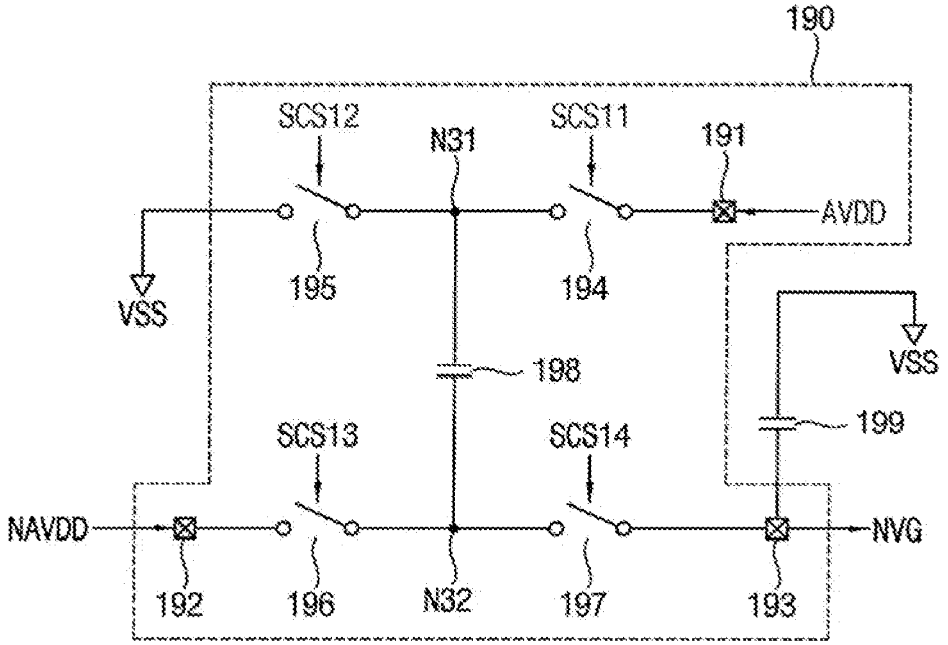
FIG. 10 is a block diagram illustrating an example of the charge pump in the voltage generator of FIG. 9 according to an example embodiment.

FIG. 10 is a block diagram illustrating an example of the charge pump in the voltage generator of FIG. 9 according to an example embodiment.

Referring to FIG. 10, the charge pump 190 may include first through fourth switches 194, 195, 196, and 197, and a first capacitor 198.

The first switch 194 may be coupled between a first terminal 191 receiving the first driving voltage AVDD and a first node N31. The second switch 195 may be coupled between the first node N31 and the ground voltage VSS. The first capacitor 198 may be coupled between the first node N31 and a second node N32. The third switch 196 may be coupled between the second node N32 and a second terminal 192 receiving the second driving voltage NAVDD. The fourth switch 197 may be coupled between the second node N32 and a third terminal 193 outputting the negative voltage NVG. A second capacitor 199 may be coupled between the third terminal 193 and the ground voltage VSS.

Each of the first through fourth switches 194, 195, 196, and 197 may receive a respective one of first through fourth switching control signals SCS11, SCS12, SCS13, and SCS14. Each of the first through fourth switches 194, 195, 196, and 197 may be turned-on or turned-off in response to the respective one of first through fourth switching control signals SCS11, SCS12, SCS13, and SCS14. The first through fourth switching control signals SCS11, SCS12, SCS13, and SCS14 may be included in the switching control signals SCS. The first through fourth switching control signals SCS11, SCS12, SCS13, and SCS14, may be included in the power control signal PCTL in FIG. 1, or the timing controller 130 may provide the first through fourth switching control signals SCS11, SCS12, SCS13, and SCS14 to the voltage generator 180 independently from the power control signal PCTL.

Figure 11:
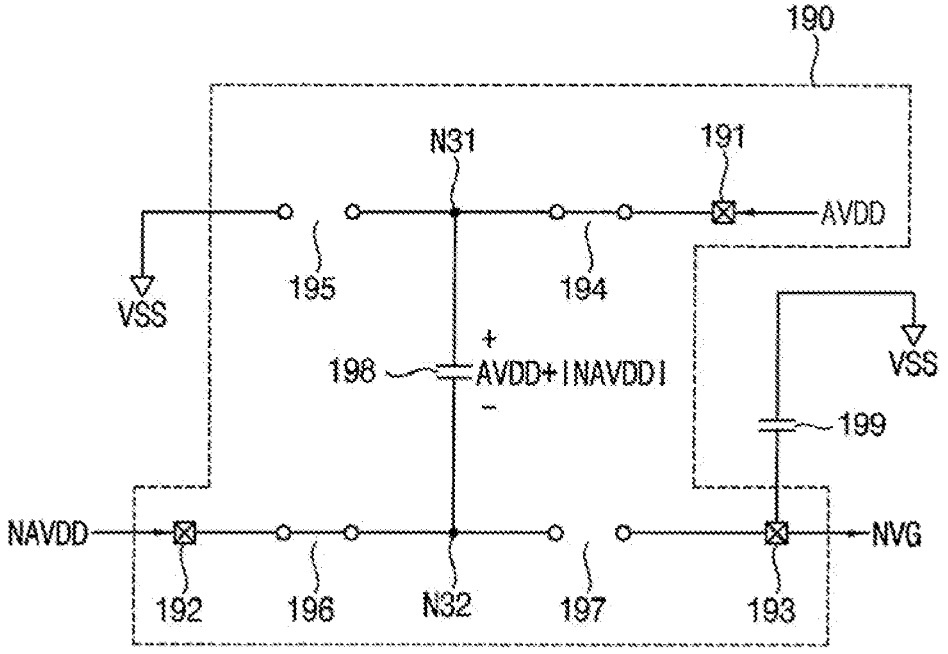
FIG. 11 illustrates an operation of the charge pump of FIG. 10 during a first phase.

FIG. 11 illustrates an operation of the charge pump of FIG. 10 during a first phase.

Referring to FIG. 11, during a first phase, when the first switch 194 and the third switch 196 are turned-on, and the second switch 195 and the fourth switch 197 are turned-off in response to the first through fourth switching control signals SCS11, SCS12, SCS13, and SCS14, a conductive path is formed from the first terminal 191 to the second terminal 192 via the first switch 194, the first node N31, the first capacitor 198, the second node N32, and the third switch 196, and the first capacitor 198 is charged with a voltage corresponding to a sum of the first driving voltage AVDD and an absolute value |NAVDD| of the second driving voltage NAVDD.

Figure 12:
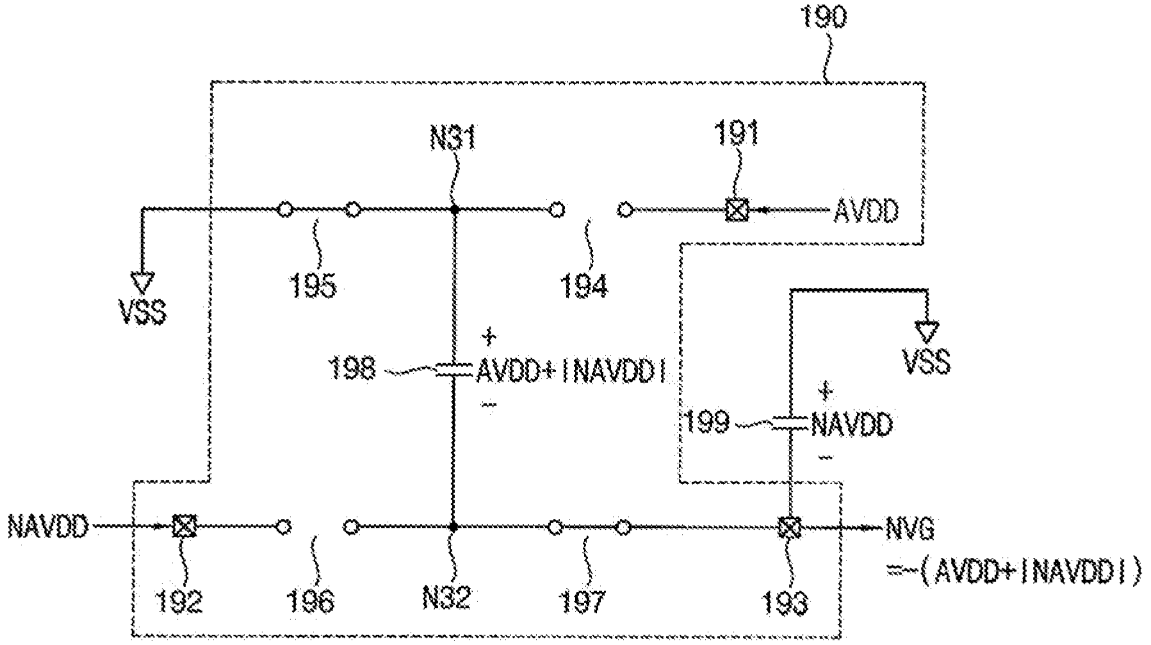
FIG. 12 illustrates an operation of the charge pump of FIG. 10 during a second phase.

FIG. 12 illustrates an operation of the charge pump of FIG. 10 during a second phase.

Referring to FIG. 12, after the first capacitor 198 is charged with a voltage corresponding to the sum of the first driving voltage AVDD and the absolute value |NAVDD| of the second driving voltage NAVDD, the first switch 194 and the third switch 196 are turned-off and the second switch 195 and the fourth switch 197 are turned-on in response to the first through fourth switching control signals SCS11, SCS12, SCS13, and SCS14 during a second phase.

Therefore, the charge pump 190 may output the negative voltage NVG (at the third terminal 193) having a negative level −(AVDD+|NAVDD|) corresponding to a sum of the first driving voltage AVDD and an absolute value |NAVDD| of the second driving voltage NAVDD. The charge pump 190 may provide the negative voltage NVG to the scan driver 200 in FIG. 1.

Figure 13:
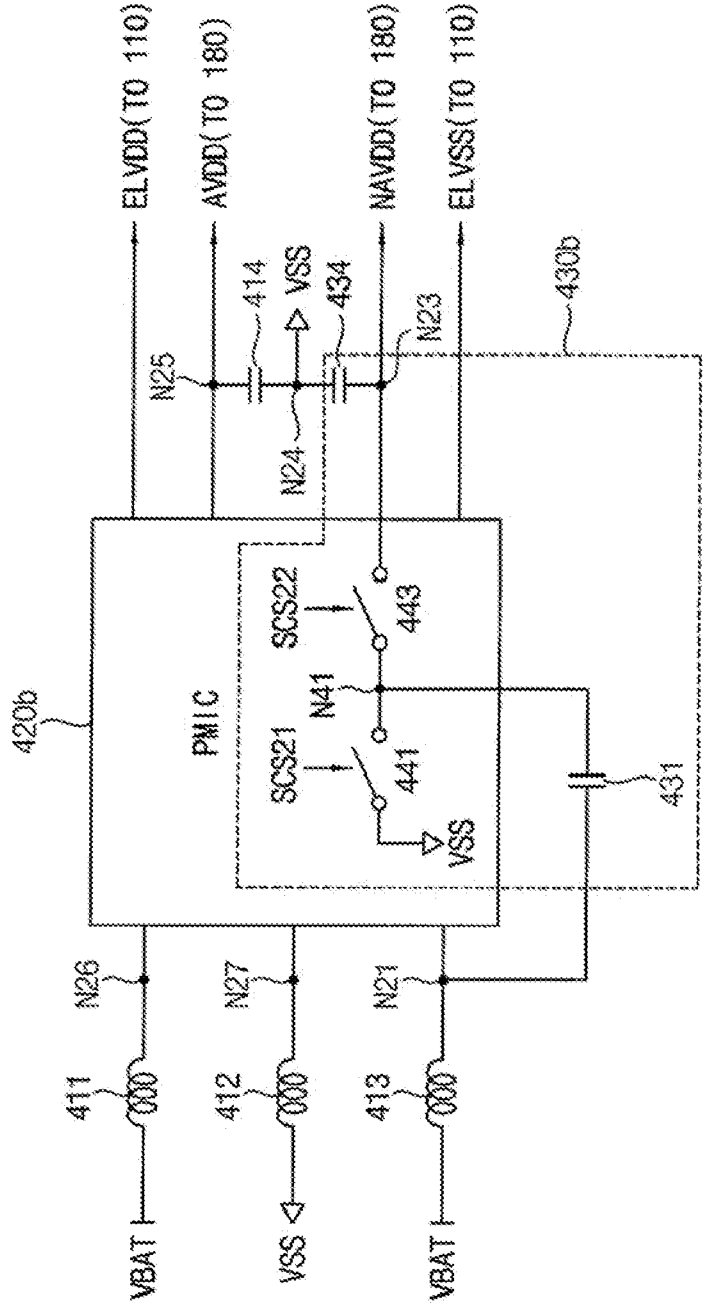
FIG. 13 is a block diagram illustrating another example of the PMAC in the OLED display system of FIG. 1 according to an example embodiment.

FIG. 13 is a block diagram illustrating another example of the PMAC in the OLED display system of FIG. 1 according to an example embodiment.

Referring to FIG. 13, a PMAC 400*b* according to an example embodiment may include a PMIC 420*b* and an additional circuit 430*b*.

The PMIC 420*b* may be coupled to an inductor 411 receiving the battery voltage VBAT at a node N26. The PMIC 420*b* may be coupled to an inductor 412 coupled to a ground voltage VSS at a node N27. The PMIC 420*b* may be coupled to an inductor 413 receiving the battery voltage VBAT at a node N21.

The PMIC 420*b* may generate the high power supply voltage ELVDD and the first driving voltage AVDD based on the battery voltage VBAT. The PMIC 420*b* may provide the high power supply voltage ELVDD to the display panel 110. The PMIC 420*b* may provide the first driving voltage AVDD to the voltage generator 180.

The PMIC 420*b* may generate the low power supply voltage ELVSS based on the ground voltage VSS and may provide the low power supply voltage ELVSS to the display panel 110. A capacitor 414 may be coupled between a node N25 connected to the PMIC 420*b* and a node N24 connected to the ground voltage VSS, and may store charges generated by the first driving voltage AVDD.

The additional circuit 430*b* may connected to an outside of the PMIC 420*b* between the nodes N21 and N24. The additional circuit 430*b* may generate the second driving voltage NAVDD based on the battery voltage VBAT stored in the inductor 413. The additional circuit 430*b* may provide the second driving voltage NAVDD to the voltage generator 180.

The additional circuit 430*b* may include a first capacitor 431, a second capacitor 434, a first switch 441, and a second switch 443. The first capacitor 431 and the second capacitor 434 may be disposed externally to the PMIC 420*b*, and may constitute a first part of the additional circuit 430*b*. The first switch 441 and the second switch 443 may be disposed in the PMIC 420*b*, and may constitute a second part of the additional circuit 430*b*.

The first capacitor 431 may be coupled between the node N21 and a node N41 in the PMIC 420*b*. The first switch 441 may be coupled to the node N41 and the ground voltage VSS. The second switch 443 may be coupled between the node N41 and the node N23. The second capacitor 434 may be coupled between the node N23 and the node N24. The additional circuit 430*b* may output the second driving voltage NAVDD at the node N23.

The first switch 441 may receive a first switching control signal SCS21. The second switch 443 may receive a second switching control signal SCS22. The first switching control signal SCS21 and the switching control signal SCS22 may be generated in the PMAC 400*b*.

When the first switch 441 is turned-on and the second switch 443 is turned-off in response to the first switching control signal SCS21 and the switching control signal SCS22 during a first phase, the first capacitor 431 may be charged with a first voltage based on the battery voltage VBAT as described with reference to FIG. 7.

When the first switch 441 is turned-off and the second switch 443 is turned-on in response to the first switching control signal SCS21 and the switching control signal SCS22 during a second phase, after the first voltage is charged in the first capacitor 431, negative charges for maintaining potential with the first voltage may be charged in the second capacitor 434, and the second capacitor 434 may be charged with a second voltage as described with reference to FIG. 8. Therefore, the additional circuit 430*b* may provide the second driving voltage NAVDD having a negative level corresponding to a level of the second voltage at the node N23.

In the PMAC 400*a* of FIG. 5, overall elements of the additional circuit 430*a* are disposed externally to the PMIC 420*a*, the additional circuit 430*a* includes the first and second diodes 432 and 433 that are conductive in response to a forward bias, and the additional circuit 430*a* provides the second driving voltage NAVDD at the node N23.

In the PMAC 400*b* of FIG. 13, some elements of the additional circuit 430*b* are included in the PMIC 420*b* as switches 441 and 443, the switches 441 and 443 are complementarily turned on/off in response to the switching control signals SCS21 and SCS22, and the additional circuit 430*b* provides the second driving voltage NAVDD at the node N23.

Figure 14:
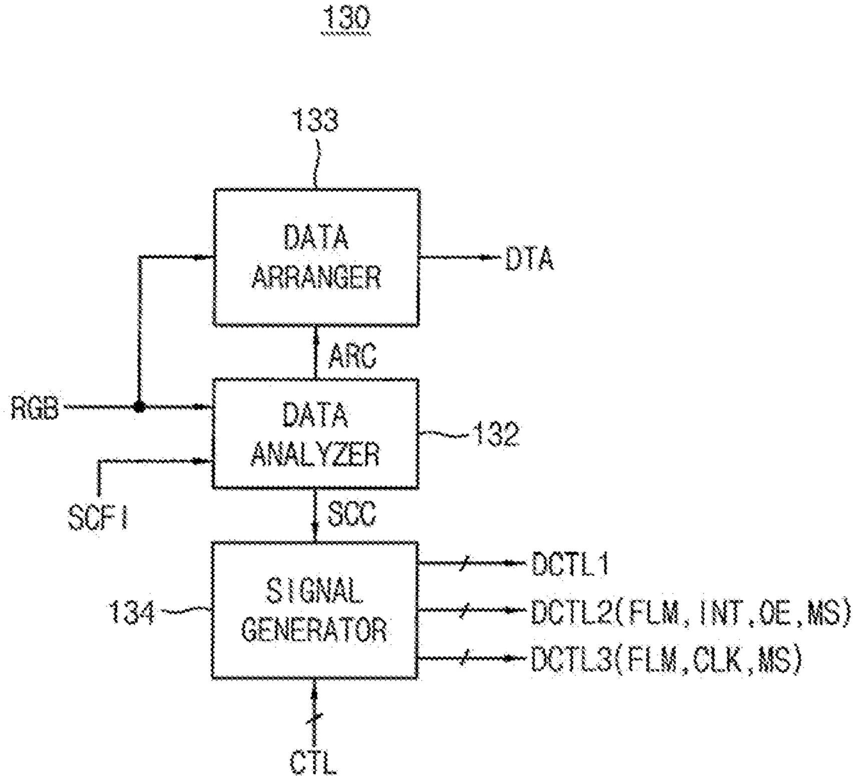
FIG. 14 is a block diagram illustrating an example of the timing controller in the OLED display system of FIG. 1.

FIG. 14 is a block diagram illustrating an example of the timing controller in the OLED display system of FIG. 1.

Referring to FIG. 14, the timing controller 130 may include a data analyzer 132, a data arranger 133, and a signal generator 134.

The data analyzer 132 may generate an arrangement control signal ARC and a scan control sequence signal SCC based on the input image data RGB and scan driver configuration information SCFI. The data analyzer 132 may provide the arrangement control signal ARC to the data arranger 133 and provide the scan control signal SCC to the signal generator 134.

The data analyzer 132 may analyze grey levels of the input image data RGB per each data line to generate the arrangement control signal ARC, and may generate the scan control signal SCC based on the scan driver configuration information SCFI including information on configuration of the scan driver 200. The scan driver configuration information SCFI may include information associated with whether the scan driver 200 includes one sub scan driver or two sub scan drivers.

The data arranger 133 may rearrange the input image data ROB according to the arrangement control signal ARC to output the data signal DTA.

The signal generator 134 may generate the first driving control signal DCTL1 that controls the data driver 150, the second driving control signal DCTL2 that controls the scan driver 200, and the third driving control signal DCTL3 that controls the emission driver 300 based on the control signal CTL and the scan control signal SCC. The signal generator 134 may generate the power control signal PCTL that controls the voltage generator 180, in response to the control signal CTL. The second driving control signal DCTL2 may include a starting signal FLM (frame line mark), a plurality of initialization signals INT, and a plurality of output enable signal OE and a mode signal MS associated with a scan mode. The third driving control signal DCTL3 may include the starting signal FLM, a clock signal CLK, and the mode signal MS.

Figure 15:
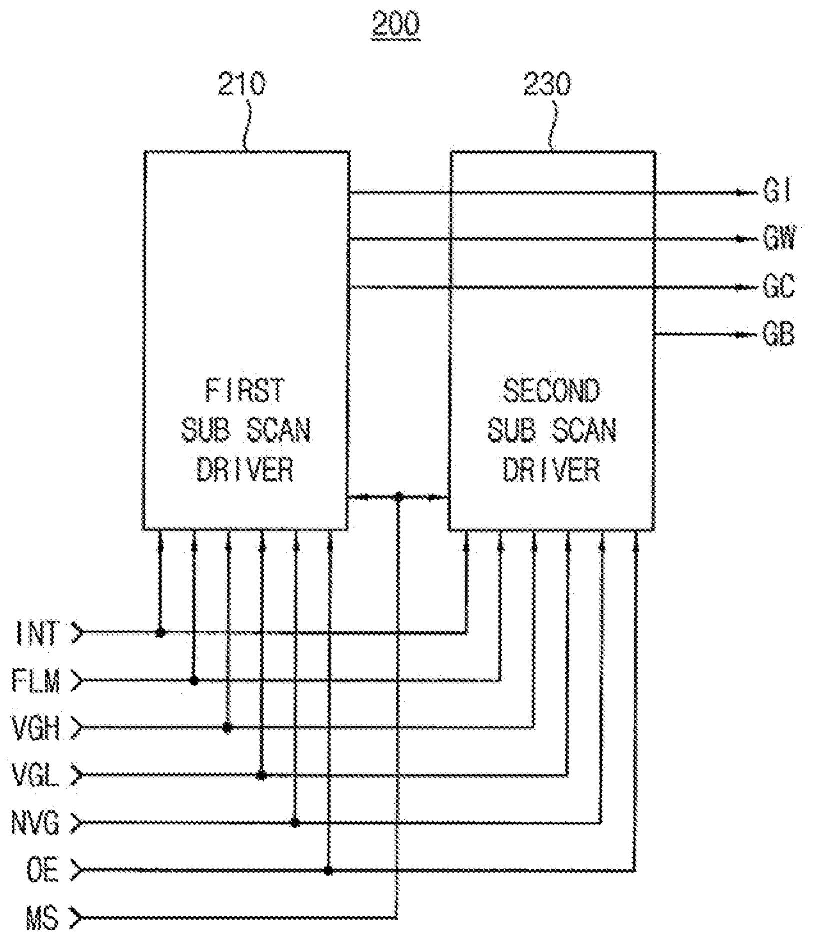
FIG. 15 is a block diagram illustrating an example of the scan driver in the OLED display system of FIG. 1 according to an example embodiment.

FIG. 15 is a block diagram illustrating an example of the scan driver in the OLED display system of FIG. 1 according to an example embodiment.

Referring to FIG. 15, a scan driver 200 may include a first sub scan driver 210 and a second sub scan driver 230.

The first sub scan driver 210 may receive an initialization signal INT, the starting signal FLM, the first sub driving voltage VGH, the second sub driving voltage VGL, the negative voltage NVG, the output enable signal OE, and the mode signal MS. The first sub scan driver 210 may generate the first scan signal GI, the second scan signal GW, and the third scan signal GC based on the initialization signal INT, the starting signal FLM, the first sub driving voltage VGH, the second sub driving voltage VGL, the negative voltage NVG, the output enable signal OE, and the mode signal MS. The first sub scan driver 210 may determine scan on-time of each of the first scan signal GI, the second scan signal GW, and the third scan signal GC.

The second sub scan driver 230 may receive the initialization signal INT, the starting signal FLM, the first sub driving voltage VGH, the second sub driving voltage VGL, the negative voltage NVG, the output enable signal OE, and the mode signal MS. The second sub scan driver 230 may generate the fourth scan signal GB based on the initialization signal INT, the starting signal FLM, the first sub driving voltage VGH, the second sub driving voltage VGL, the negative voltage NVG, the output enable signal OE, and the mode signal MS. The second sub scan driver 230 may determine scan on-time the fourth scan signal GB.

Figure 16:
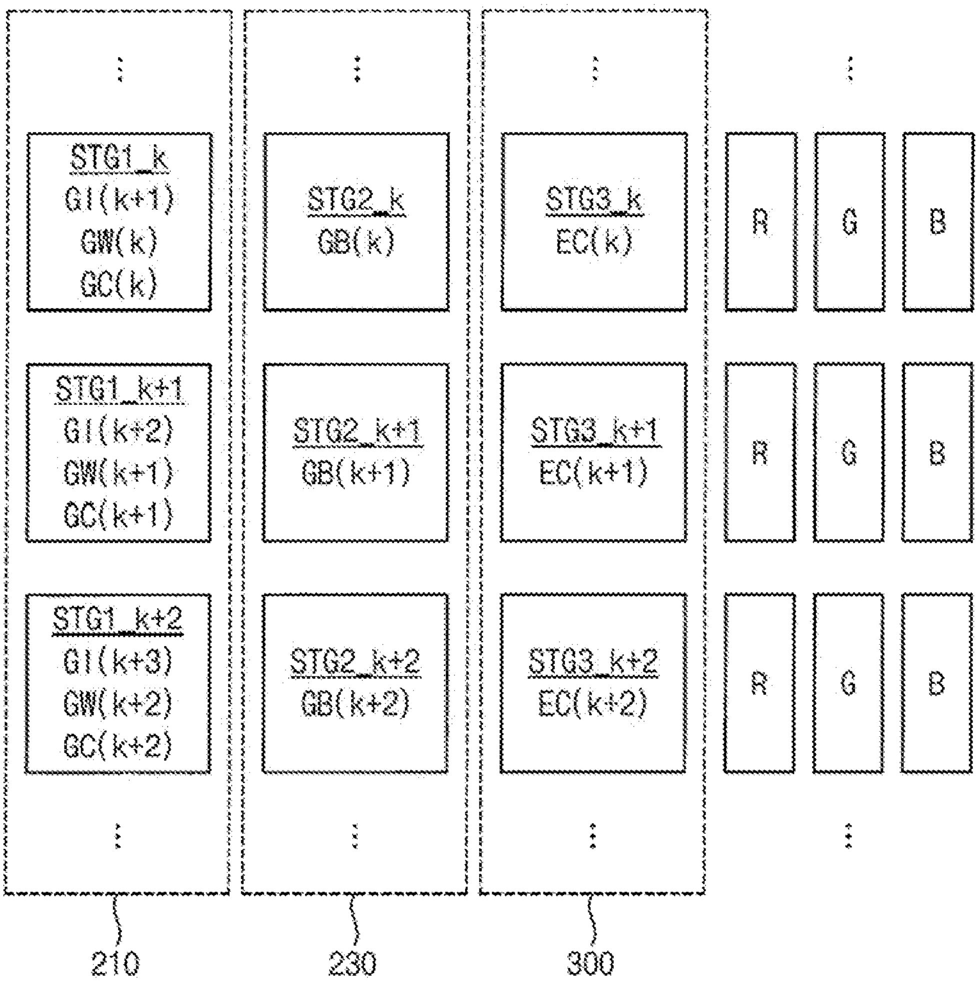
FIG. 16 illustrates the scan driver of FIG. 15 and the emission driver in FIG. 1 altogether.

FIG. 16 illustrates the scan driver of FIG. 15 and the emission driver in FIG. 1 altogether. In FIG. 16, some stages of a plurality of stages in the first sub scan driver 210 and the second sub scan driver 230 and some stages of a plurality of stages in the emission driver 300 in FIG. 1 are illustrated.

Referring to FIG. 16, the first sub scan driver 210 may include stages STG1_*k*, STG1_*k*+1, and STG1_*k*+2. The second sub scan driver 230 may include stages STG2_*k*, STG2_*k*+1, and STG2_*k*+2. The emission driver 300 may include stages STG3_*k*, STG3_*k*+1, and STG3_*k*+2. Here, k is a natural number and may be one of 1~n.

Each of the stages STG2_*k*, STG2_*k*+1, and STG2_*k*+2 in the second sub scan driver 230 may generate respective one of fourth scan signals GB(k), GB(k+1), and GB(k+2) associated with corresponding pixel rows of the pixels 111 in FIG. 1, and each of the STG3_*k*, STG3_*k*+1 and STG3_*k*+2 in the emission driver 300 may generate respective one of emission control signals EC(k), EC(k+1), and EC(k+2) associated with corresponding pixel rows of the pixels 111 in FIG. 1.

The stage STG1_*k* in the first sub scan driver 210 may generate a first scan signal GI(k+1) associated with a (k+1)-th pixel row, a second scan signal GW(k) associated with a k-th pixel row, and a third scan signal GC(k) associated with the k-th pixel row. The stage STG1_*k*+1 in the first sub scan driver 210 may generate a first scan signal GI(k+2) associated with a (k+2)-th pixel row, a second scan signal GW(k+1) associated with the (k+1)-th pixel row, and a third scan signal GC(k+1) associated with the (k+1)-th pixel row. The stage STG1_*k*+2 in the first sub scan driver 210 may generate a first scan signal GI(k+3) associated with a (k+3)-th pixel row, a second scan signal GW(k+2) associated with the (k+2)-th pixel row, and a third scan signal GC(k+2) associated with the (k+2)-th pixel row.

The first sub scan driver 210 may be fabricated by merging circuits associated with the second scan signal GW and the third scan signal GC, or may be fabricated by merging circuits associated with the first scan signal GI, the second scan signal GW, and the third scan signal GC. Therefore, an occupied area by the first sub scan driver 210 may be reduced.

Figure 17:
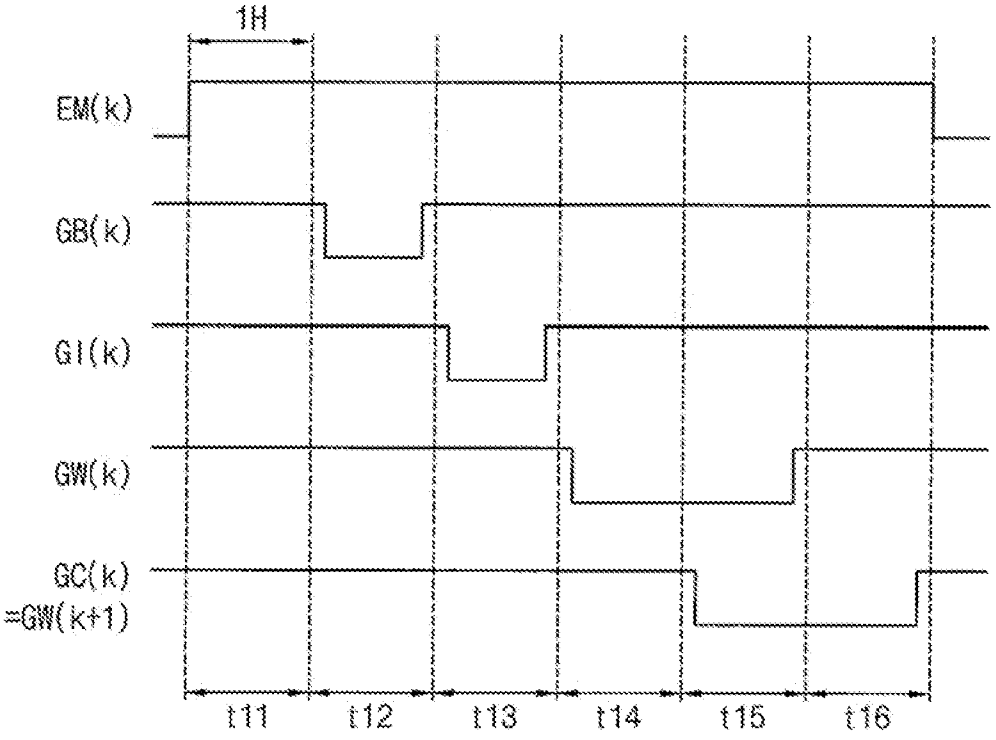
FIG. 17 illustrates signals from the scan driver in FIG. 16 that drive the scan lines, respectively.

In FIG. 16, R, G, and B represent pixels displaying corresponding colors, respectively, FIG. 17 illustrates signals from the scan driver in FIG. 16 that drive the scan lines, respectively.

In FIG. 17, it is assumed that the emission driver 300 disables the emission control signal EC(k) with a logic high level during a non-emission interval, and the non-emission interval includes consecutive first through sixth horizontal periods t11~t16, and each horizontal period in the consecutive first through sixth horizontal periods t11~t16 corresponds to one horizontal period 1H. In addition, it is assumed that the emission driver 300 applies the emission control signal EC(k) to the emission transistors T5 and T6 in the k-th pixel row, and the scan driver 200 applies the first scan signal GI(k) to the first initialization transistor T4 in the k-th pixel row, applies the second scan signal GW(k) to the switching transistor T1 in the k-th pixel row, applies the third scan signal GC(k) to the compensation transistor T3 in the k-th pixel row, and applies the fourth scan signal GB(k) to the second initialization transistor T7 in the k-th pixel row.

Referring to FIG. 17, the scan driver 200 may enable the fourth scan signal GB(k) during the second horizontal period t12, may enable the first scan signal GI(k) during the third horizontal period t13, may enable the second scan signal GW(k) during the fourth and fifth horizontal periods t14 and t15, and may enable the third scan signal GC(k) during the fifth and sixth horizontal periods t15 and t16.

Enablement of the second scan signal GW(k) and the third scan signal GC(k) are partially overlapped during the fifth horizontal period t15, and the second scan signal GW(k) and the third scan signal GC(k) are enabled in consecutive two horizontal periods. Therefore, the scan driver 200 may increase scan on-time of the second scan signal GW(k) and the third scan signal GC(k) to reduce crosstalk and low gray-level staining. The scan driver 200 may use the third scan signal GC(k) for the k-th pixel row as the second scan signal GW(k+1) for the (k+1)-th pixel row.

Referring to FIG. 17, when the second scan signal CW(k) and the third scan signal GC(k) are driven during consecutive two horizontal periods 2H, the data voltage is stored in the storage capacitor CST based on the second scan signal CW(k) and compensation for variance of threshold voltage of the driving transistor T2 is performed based on the third scan signal GC(k).

Figure 18:
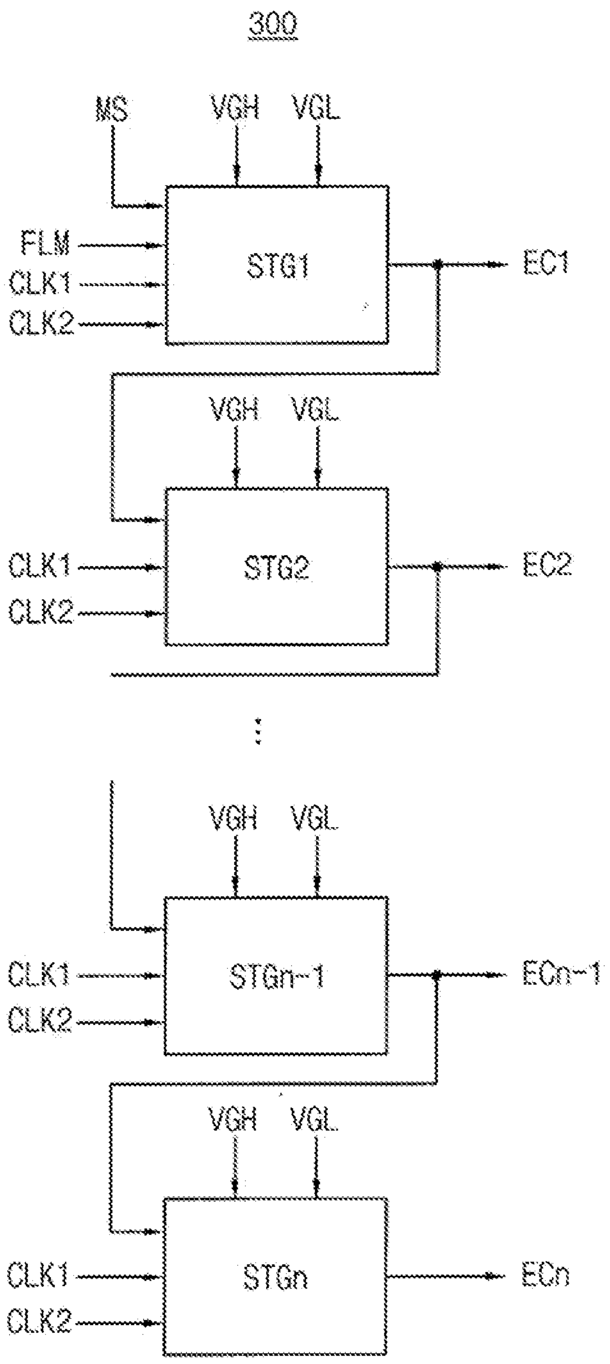
FIG. 18 is a block diagram illustrating the emission driver shown in the OLED display system of FIG. 1 according to an example embodiment.

FIG. 18 is a block diagram illustrating the emission driver shown in the OLED display system of FIG. 1 according to an example embodiment.

Referring to FIG. 18, the emission driver 300 may include a plurality of stages STG1~STGn connected to each other one after another to sequentially output the emission control signals EC1~ECn.

The stages STG1~STGn may be connected to the emission control lines EL1~ELn, respectively, and may sequentially output the emission control signals EC1~ECn. The emission control signals EC1~ECn may overlap each other during a predetermined period.

Each of the stages STG1~STGn may receive the first voltage VGL and the second voltage VGH having the voltage level higher than that of the first voltage VGL. In addition, each of the stages STG1~SIGn may receive a first clock signal CLK1 and a second clock signal CLK2, and one or more of the stages STG1~STGn may receive the mode signal MS. The mode signal MS may determine a number of horizontal periods included in the non-emission interval. Thus, the mode signal MS may determine a time interval of the non-emission interval.

Hereinafter, the emission control signals EC1~EC2 output through the emission control lines EL1~ELn may be referred to as first to n-th emission control signals.

Among the stages SIG1~STGn, the first stage STG1 may be driven in response to the starting signal FLM. The first stage STG1 may receive the first voltage VGL and the second voltage VGH, and generate the first emission control signal EC1 in response to the starting signal FLM, the first clock signal CLK1, the second clock signal CLK2, and the mode signal MS. The first emission control signal EC1 may be applied to the pixels in the pixel row through the first emission control line EL1.

The stages STG1~STGn may be connected to each other one after another and are sequentially driven. Thus, a present stage may be connected to an output electrode of a previous stage and receive the emission control signal output from the previous stage. The present stage may be driven in response to the emission control signal provided from the previous stage.

For example, a second stage STG2 may receive the first emission control signal EC1 output from the first stage STG1 and may be driven in response to the first emission control signal EC1. The second stage STG2 may receive the first voltage VGL and the second voltage VGH, and generate the second emission control signal EC2 in response to the first emission control signal Ec1, the first clock signal CLK1, and the second clock signal CLK2. The second emission control signal EC2 may be applied to the pixels in the pixel row through the second emission control line EL2. The other stages STG3 to STGn may be driven in the same way as the second stage STG2.

Figure 19:
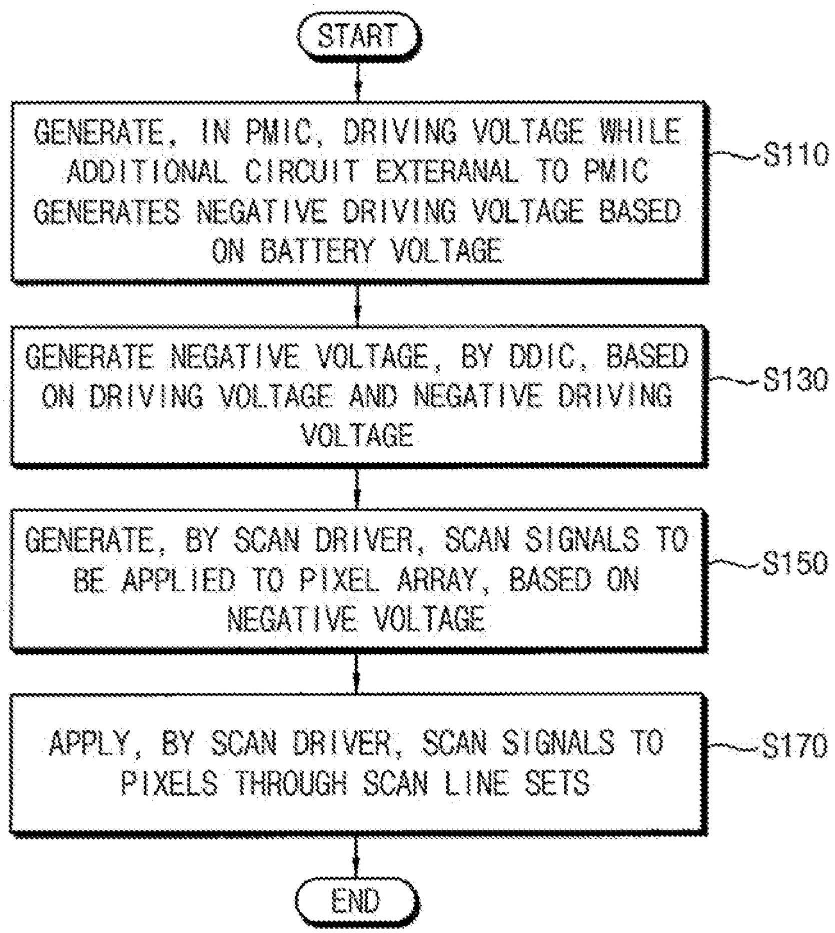
FIG. 19 is a flow chart illustrating a method of driving an OLED display system including an OLED display device according to an example embodiment.

FIG. 19 is a flow chart illustrating a method of driving an OLED display system including an OLED display device according to an example embodiment.

Referring to FIGS. 1 through 19, an example embodiment provides a method of driving an OLED display system 50 that includes an OLED display device 100 including a display panel 110 having a plurality of pixels 111. In the present example embodiment, the additional circuit 430*a* external to the PMIC 420*a* generates the second driving voltage NAVDD having a negative level based on the battery voltage VBAT, while the PMIC 420*a* in the PMAC 400*a* generates the first driving voltage AVDD based on the battery voltage VBAT (operation S110).

The additional circuit 430*a* may be distinct from the PMIC 420*a* and may be disposed externally to the PMIC 420*a*. The additional circuit 430*a* may include two capacitors and two diodes or the additional circuit 430*a* may include two capacitors and two switches. In an example embodiment, overall elements of the additional circuit 430*a* are disposed externally to the PMIC 420*a*. In another example embodiment, some elements of the additional circuit 430*b* are included in the PMIC 4201*b* and other elements of the additional circuit 430*b* are disposed externally to the PMIC 420*b*.

In the method according to the present example embodiment, the voltage generator 180 in the driving circuit 105, which is separated from the PMIC 420*a* or 420*b*, generates the negative voltage VNG based on the first driving voltage AVDD and the second driving voltage NAVDD (operation S130). The voltage generator 180 provides the negative voltage to the scan driver 200.

The scan driver 200 may generate at least one of the scan signals GI, GW, GC, and GB using the second sub driving voltage VGL based on the negative voltage NVG (operation S150). The scan signals GI, GW, GC, and GB may be enabled with a low level.

In the method according to the present example embodiment, data voltages are output to the plurality of pixels 111 by a data driver 150 connected to the display panel 110 through a plurality of data lines Dl1~Dlm. The plurality of scan signals GI, GW, GC, and GB are sequentially output to the plurality of pixels 111 by the scan driver 200 connected to the display panel 110 through a plurality of scan line sets SLS1~SLSn (operation S170).

The scan driver 200 may enable at least two scan signals of the plurality of scan signals GI, GW, GC, and GB during non-emission interval in which the pixels 111 do not emit light, thus enabling least two scan signals that are partially overlapped during consecutive two horizontal periods.

Figure 20:
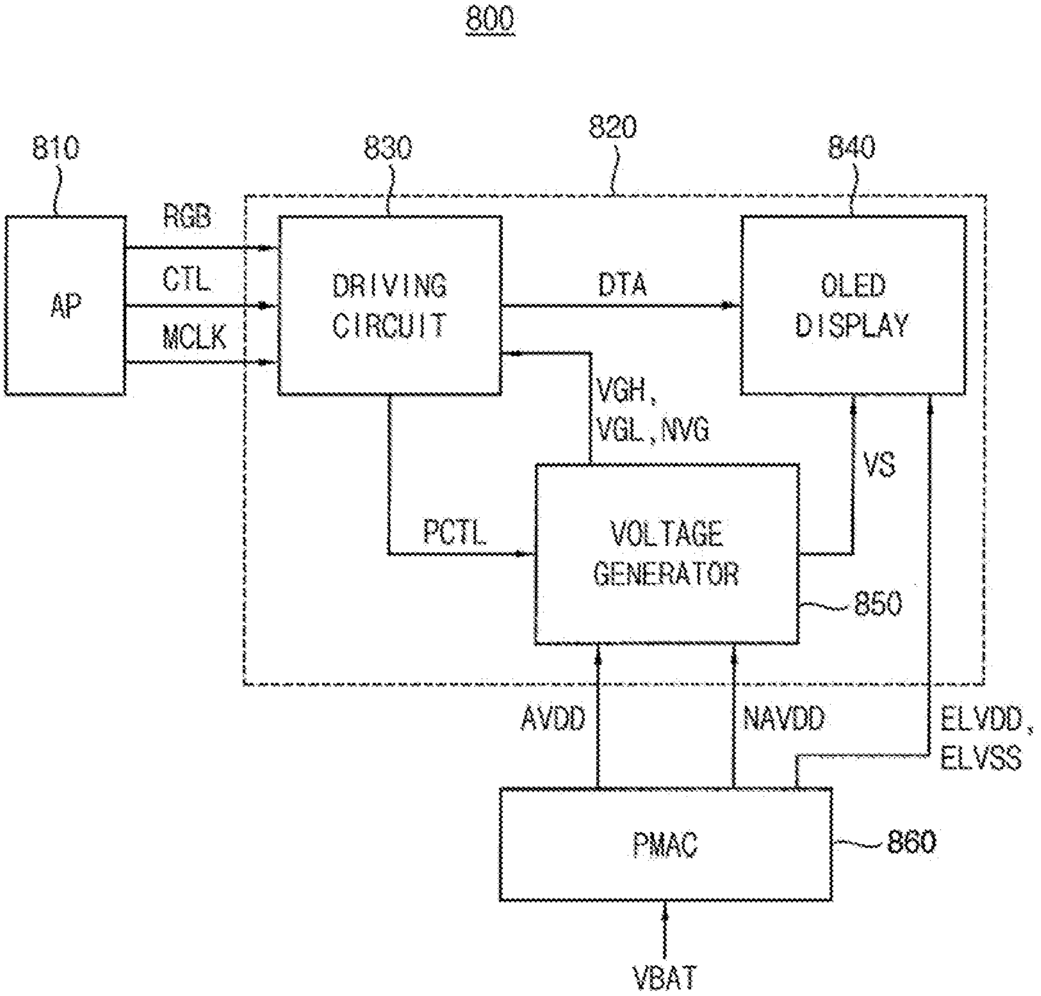
FIG. 20 is a block diagram illustrating an example of an OLED display system according to an example embodiment.

FIG. 20 is a block diagram illustrating an example of an OLED display system according to an example embodiment.

Referring to FIG. 20, an OLED display system 800 may include an application processor 810, an OLED display device 820, and a PMAC 860.

The OLED display device 820 may include a driving circuit 830, a display panel (OLED display) 840, and a voltage generator 850.

The voltage generator 850 may provide initialization voltages to the display panel 840 in response to a power control signal PCTL from the driving circuit 830. The voltage generator 850 may generate a first sub driving voltage VGH, a second sub driving voltage VGL, and a negative voltage NVG based on a first driving voltage AVDD and a second driving voltage NAVDD. The voltage generator 850 may provide the first sub driving voltage VGH, the second sub driving voltage VGL, and the negative voltage NVG to a scan driver of the driving circuit 830.

The scan driver may generate scan signals to be provided to the display panel 840 based on the first sub driving voltage VGH, the second voltage VGL, and the negative voltage NVG.

The driving circuit 830 and the voltage generator 850 may be incorporated into one integrated circuit (IC).

The PMAC 960 may generate a high power supply voltage ELVDD and a low power supply voltage ELVSS based on as battery voltage VBAT. The PMAC 960 may provide the high power supply voltage ELVDD and the low power supply voltage ELVSS to the display panel 840. The PMAC 960 may generate the first driving voltage AVDD and the second during voltage NAVDD based on the battery voltage VBAT. The PMAC 960 may provide the first driving voltage AVDD and the second driving voltage NAVDD to the voltage generator 850.

The PMAC 860 may include a PMIC, which generates the first driving voltage AVDD, and an additional circuit that is distinct from the PMIC and disposed externally to the PMIC, which generates the second driving voltage NAVDD. The PMAC 800 may include the PMAC 400*a* of FIG. 5 or the PMAC 400*b* of FIG. 13. The PMAC 860 may generate the second driving voltage NAVDD by using a general PMIC without design change of the general PMIC or with minimum design change of the general PMIC, and may provide the second driving voltage NAVDD to the voltage generator 850.

The OLED display system 800 may be a portable device such as a laptop, a cellular phone, a smart phone, a personal computer (PC), a personal digital assistant (PDA), a portable multi-media player (PMP), or MP3 player, a navigation system, etc.

The application processor 810 may provide an image signal RGB, a control signal CTL, and a main clock signal MCLK to the OLED display device 820. The driving circuit 830 may provide data DTA to the display panel 840.

Figure 21:
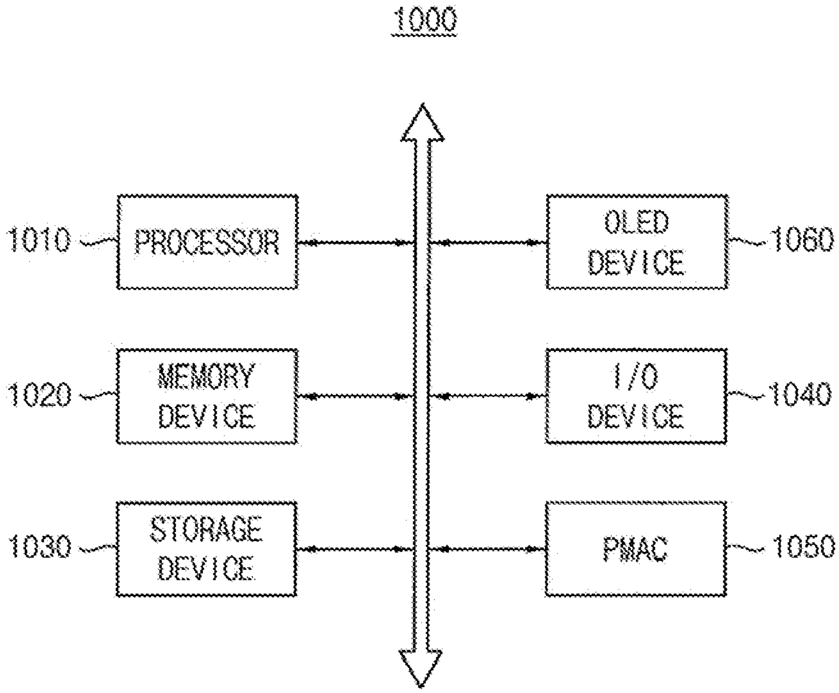
FIG. 21 a block diagram illustrating an electronic device including an OLED display device according to an example embodiment.

FIG. 21 a block diagram illustrating an electronic device including an OLED display device according to an example embodiment.

Referring to FIG. 21, an electronic device 1000 may include a processor 1010, a memory device 1020, a storage device 1030, an input/output (I/O) device 1040, a PMAC 1050, and an OLED display device 1060. The electronic device 1000 may further include a plurality of ports for communicating with a video card, a sound card, a memory card, a universal serial bus (USB) device, other electronic systems, etc.

The processor 1010 may perform various computing functions or tasks. The processor 1010 may be for example, a microprocessor, a central processing unit (CPU), etc. The processor 1010 may be connected to other components via an address bus, a control bus, a data bus, etc. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as a flash memory device, and/or at least one volatile memory device such as a dynamic random access memory (DRAM) device, a static random access memory (SRAM) device, a mobile dynamic random access memory (mobile DRAM) device, etc.

The storage device 1030 may be, for example, a solid state drive (SSD) device, a hard disk drive (HDD) device, a CD-ROM device, etc. The I/O device 1040 may be, for example, an input device such as a keyboard, a keypad, a mouse, a touch screen, etc., and/or an output device such as a printer, a speaker, etc. The PMAC 1050 may supply power for operations of the electronic device 1000. The organic light emitting display device 1060 may communicate with other components via the buses or other communication links.

The OLED display device 1060 may employ the OLED display device 100 in FIG. 1. Therefore, the OLED display device 1060 may include a driving circuit and a display panel, and the driving circuit may include a data driver, a scan driver, and a voltage generator. The voltage generator may generate a negative voltage, and may provide the negative voltage to the scan driver. The scan driver may generate scan signals based on the negative voltage, and may enable at least two scan signals of the scan signals during non-emission interval in which pixels do not emit light such that enabling of least two scan signals is partially overlapped during consecutive two horizontal periods. Therefore, the scan driver may reduce crosstalk and low gray-level staining when the OLED display device is driven with a high frequency.

The PMAC 1050 may include a PMIC, which generates the first driving voltage, and an additional circuit that is distinct from the PMIC and disposed externally to the PMIC, which generates the second driving voltage. The PMAC 1050 may include the PMAC 400*a* of FIG. 5 or the PMAC 400*b* of FIG. 13. The PMAC 1050 may generate the second driving voltage by using a general PMIC without design change of the general PMIC or with minimum design change of the general PMIC, and may provide the second driving voltage to a voltage generator in the OLED display device 1060.

The electronic device 1000 may be a mobile electronic device including the OLED display device 1060 such as a smart phone.

Example embodiments mays be applied to a suitable display device or a suitable electronic device including a display device displaying a stereoscopic image. For example, example embodiments may be applied to a television, a computer monitor, a laptop, a digital camera, a cellular phone, a smart phone, a personal digital assistant (PDA), a portable multimedia player (PMP), a MP3 player, a navigation system, a video phone, etc.

By way of summation and review, an OLED display system may include an OLED display device and a power management integrated circuit (PMIC). Improving performance of the PMIC is desirable.

As described above, embodiments may provide an OLED display system capable of generating a driving voltage having negative level without an additional inductor, and capable of generating a negative voltage based on the driving voltage.

The PMAC in the OLED display system may include a PMIC, to generate a first driving voltage having a positive level, and an additional circuit that distinct from the PMIC and disposed externally to the PMIC, to generate a second driving voltage having a negative level. A voltage generator in the DDIC generates scan signals which are enabled with low level based on the second driving voltage. Therefore, the PMAC may generate the second driving voltage by using a conventional PMIC without design change of the conventional PMIC or with minimum design change of the conventional PMIC.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An organic light emitting diode (OLED) display system, comprising:

a display panel including a plurality of pixels;

a driving circuit connected to the plurality of pixels through a plurality of scan line sets and a plurality of data lines, the driving circuit configured to provide a plurality of scan signals to the display panel and configured to provide data voltages to the plurality of data lines;

a voltage generator configured to generate a negative voltage based on a first driving voltage having a positive level and a second driving voltage having a negative level, and configured to provide the negative voltage to the driving circuit; and a power management application circuit including a power management integrated circuit (PMIC) and an additional circuit, the PMIC configured to apply a high power supply voltage and a low power supply voltage to the display panel and configured to generate the first driving voltage based on a battery voltage, the additional circuit configured to generate the second driving voltage based on the battery voltage, wherein the additional circuit includes a first part distinct from the PMIC and disposed externally to the PMIC and a second part disposed in the PMIC, wherein the driving circuit is configured to generate at least one of the plurality of scan signals based on the negative voltage, and wherein the additional circuit includes:

a first capacitor coupled between a first node and a second node in the PMIC, the first node being coupled to an inductor to store the battery voltage;

a first switch coupled between the second node and a ground voltage;

a second switch coupled between the second node and a third node to receive the second driving voltage; and a second capacitor coupled between the third node and a fourth node connected to the ground voltage, wherein the first part includes the first capacitor and the second capacitor, and wherein the second part includes the first switch and the second switch.

2. The OLED display system of claim 1, configured such that:

during a first phase, the first switch is turned-on, the second switch is turned-off, and the first capacitor is charged with a first voltage based on the battery voltage, during a second phase, the first switch is turned-off, the second switch is turned-on, and the second capacitor is charged with a second voltage for maintaining potential with the first voltage, and the additional circuit is configured to output the negative voltage having a negative level corresponding to a sum of the first voltage and the second voltage.

3. The OLED display system of claim 2, configured such that:

during the first phase, the first switch is turned-on and the second switch is turned-off in response to respective one of a first switching control signal and a second switching control signal, and during the second phase, the first switch is turned-off and the second switch is turned-on in response to respective one of the first switching control signal and the second switching control signal.

4. The OLED display system of claim 3, further comprising a timing controller configured to generate the first switching control signal and the second switching control signal.

5. The OLED display system of claim 1, wherein the voltage generator includes:

a main booster configured to generate a first sub driving voltage based on the first driving voltage;

a charge pump configured to generate the negative voltage based on the first driving voltage, the second driving voltage, and a plurality of switching control signals; and a sub booster configured to generate a first initialization voltage, a second initialization voltage, and a second sub driving voltage based on the negative voltage, wherein the voltage generator is configured to:

provide the first sub driving voltage, the second sub driving voltage, and the negative voltage to a scan driver in the driving circuit; and provide the first initialization voltage and the second initialization voltage to the display panel.

6. The OLED display system of claim 5, wherein the charge pump includes:

a third switch coupled between a first terminal to receive the first driving voltage and a fifth node;

a fourth switch coupled between the fifth node and a ground voltage;

a third capacitor coupled between the fifth node and a sixth node;

a fifth switch coupled between the fifth node and a second terminal to receive the second driving voltage; and a sixth switch coupled between the sixth node and a third terminal to output the negative voltage, and wherein the third terminal is connected to a second capacitor coupled to the ground voltage, the third switch receives a first switching control signal, the fourth switch receives a second switching control signal, the fifth switch receives a third switching control signal, and the sixth switch receives a fourth switching control signal.

7. The OLED display system of claim 6, configured such that:

during a first phase, the third switch and the fifth switch are turned-on and the fourth switch and the sixth switch are turned-off in response to the first through fourth switching control signals, the third capacitor is charged with a voltage corresponding to a sum of the first driving voltage and an absolute value of the second driving voltage, and during a second phase, the third switch and the fifth switch are turned-off and the fourth switch and the sixth switch are turned-on in response to the first through fourth switching control signals.

8. The OLED display system of claim 7, wherein the charge pump is configured to output the negative voltage at the third terminal, the negative voltage having a negative level corresponding to a sum of the first driving voltage and an absolute value of the second driving voltage.

9. The OLED display system of claim 5, wherein the driving circuit includes:

a scan driver configured to provide first through fourth scan signals to each of pixel rows including the plurality of pixels;

a data driver configured to provide the data voltages corresponding to data signals to the plurality of data lines connected to the plurality of pixels;

an emission driver configured to provide emission control signals to a plurality emission control lines connected to the plurality of pixels; and a timing controller configured to control the scan driver, the data driver, the emission driver, and the voltage generator, wherein the timing controller is configured to process input image data to generate the data signals.

10. The OLED display system of claim 9, wherein each of the plurality of scan line sets includes a first scan line, a second scan line, a third scan line, and a fourth scan line, wherein each of the plurality of pixels includes:

a switching transistor that has a first electrode coupled to a respective one of the plurality of data lines, a gate coupled to the first scan line, and a second electrode a first node;

a storage capacitor coupled between the high power supply voltage and a second node;

a driving transistor that has a first electrode coupled to the first node, a gate coupled to the second node, and a second electrode coupled to a third node;

a compensation transistor that has a first electrode coupled to the second node, a gate coupled to the third scan line, and a second electrode coupled to the third node;

a first initialization transistor that has a first electrode coupled to the second node, a gate coupled to the first scan line, and a second electrode coupled to a first initialization voltage;

a second initialization transistor that has a first electrode coupled to the high power supply voltage, a gate receiving a respective one of the emission control signals, and a second electrode coupled to the first node;

a first emission transistor that has a first electrode coupled to the third node, a gate receiving the respective one of the emission control signals, and a second electrode coupled to a fourth node;

a second emission transistor that has a first electrode coupled to the fourth node, a gate coupled to the fourth scan line, and a second electrode coupled to a second initialization voltage; and an OLED coupled between the fourth node and the low power supply voltage.

11. The OLED display system of claim 10, wherein each of the switching transistor, the compensation transistor, the first initialization transistor, and the second initialization transistor includes a p-channel metal-oxide semiconductor (PMOS) transistor.

12. The OLED display system of claim 11, wherein the scan driver is configured to enable the first through fourth scan signals with a low signal level.

13. The OLED display system of claim 9, wherein the scan driver includes:

a first sub scan driver configured to generate the first through third scan signals based on the negative voltage, the first sub driving voltage, and the second sub driving voltage; and a second sub scan driver configured to generate the fourth scan signal based on the negative voltage, the first sub driving voltage, and the second sub driving voltage.

14. An organic light emitting diode (OLED) display system, comprising:

a display panel including a plurality of pixels;

a driving circuit connected to the plurality of pixels through a plurality of scan line sets and a plurality of data lines, the driving circuit configured to provide a plurality of scan signals to the display panel and configured to provide data voltages to the plurality of data lines;

a voltage generator configured to generate a negative voltage based on a first driving voltage having a positive level and a second driving voltage having a negative level, and configured to provide the negative voltage to the driving circuit; and a power management application circuit including a power management integrated circuit (PMIC) and an additional circuit, the PMIC configured to apply a high power supply voltage and a low power supply voltage to the display panel and configured to generate the first driving voltage based on a battery voltage, the additional circuit configured to generate the second driving voltage based on the battery voltage, wherein the driving circuit is configured to generate at least one of the plurality of scan signals based on the negative voltage, and wherein the additional circuit includes:

a first capacitor coupled between a first node and a second node in the PMIC, the first node being coupled to an inductor to store the battery voltage;

a first switch coupled between the second node and a ground voltage;

a second switch coupled between the second node and a third node to receive the second driving voltage; and a second capacitor coupled between the third node and a fourth node connected to the ground voltage.

* * * * *